United States Patent [19]
Erdman

[11] Patent Number: 5,376,866
[45] Date of Patent: Dec. 27, 1994

[54] MOTOR CONTROLS, REFRIGERATION SYSTEMS AND METHODS OF MOTOR OPERATION AND CONTROL

[75] Inventor: David M. Erdman, Fort Wayne, Ind.

[73] Assignee: General Electric Company, Fort Wayne, Ind.

[21] Appl. No.: 38,135

[22] Filed: Mar. 26, 1993

Related U.S. Application Data

[60] Division of Ser. No. 661,818, Feb. 27, 1991, Pat. No. 5,227,704, which is a division of Ser. No. 227,156, Aug. 2, 1988, abandoned, which is a continuation of Ser. No. 15,409, Feb. 17, 1987, Pat. No. 4,763,347, which is a continuation-in-part of Ser. No. 463,147, Feb. 2, 1983, Pat. No. 4,654,566, which is a continuation-in-part of Ser. No. 412,421, Aug. 27, 1982, Pat. No. 4,449,079, which is a continuation of Ser. No. 141,267, Apr. 17, 1980, abandoned, which is a continuation-in-part of Ser. No. 77,656, Sep. 21, 1979, abandoned, which is a continuation-in-part of Ser. No. 802,484, Jun. 1, 1977, Pat. No. 4,169,990, which is a continuation-in-part of Ser. No. 729,761, Oct. 5, 1976, abandoned, which is a continuation-in-part of Ser. No. 482,409, Jun. 24, 1974, Pat. No. 4,005,347, and Ser. No. 482,407, Jun. 24, 1974, Pat. No. 4,015,182.

[51] Int. Cl.$^5$ .............. H02P 1/18; H02P 6/02
[52] U.S. Cl. .................... 318/254; 361/33; 361/90; 318/431
[58] Field of Search ............. 318/138, 254, 439, 430, 318/431, 432, 433, 434; 361/23, 24, 30, 31, 33, 51, 90, 91, 92

[56] References Cited

U.S. PATENT DOCUMENTS

| | | | |
|---|---|---|---|
| 3,324,672 | 6/1967 | Sones et al. | 62/180 |
| 3,449,922 | 6/1969 | Ruff et al. | 62/160 |
| 3,667,018 | 5/1972 | Rakes | 318/254 |
| 3,667,019 | 5/1972 | Elliott et al. | 318/254 |
| 3,668,883 | 6/1972 | Ruff et al. | 62/158 |
| 3,705,337 | 12/1972 | Grabi | 318/254 |
| 3,748,554 | 7/1973 | McDonald | 318/138 |
| 3,749,204 | 7/1973 | Caputo | 187/29 |
| 3,757,185 | 9/1973 | Brunner et al. | 318/254 |
| 3,759,051 | 9/1973 | Ohnishi | 62/180 |
| 3,864,610 | 2/1975 | Kawamoto et al. | 318/317 |
| 3,887,844 | 6/1975 | Yoshida | 318/254 X |
| 3,911,338 | 10/1975 | Igarashi et al. | 318/138 |
| 3,916,272 | 10/1975 | Grunleitner et al. | 318/138 |
| 4,027,215 | 5/1977 | Knight et al. | 318/254 X |
| 4,034,274 | 7/1977 | Akima | 318/334 |
| 4,051,420 | 9/1977 | Tanikoshi | 318/254 |
| 4,078,194 | 3/1978 | Johnson, Jr. | 318/331 |
| 4,207,510 | 6/1980 | Woodbury | 318/802 |
| 4,492,903 | 1/1985 | Knight et al. | 318/341 |

Primary Examiner—Bentsu Ro
Attorney, Agent, or Firm—Ralph E. Krisher, Jr.

[57] ABSTRACT

A method of operating a brushless motor having a stationary assembly with at least two different energizable windings for producing spaced apart magnetic fields in time sequence, and a rotor adapted to rotate in response to the magnetic fields. The method includes the steps of simulating rotor position in accordance with the back emf condition of at least one winding, energizing a selected one of the windings in accordance with the simulated rotor position, sensing an underspeed condition when the motor speed is less than a minimum value for a length of time, and preventing energization of any of the windings when the motor speed is less than the minimum value for the length of time. An electrically commutated motor controller apparatus controls and speed of a variable speed motor compressor driven by an electrically commutated motor. A controller circuit includes a circuit for producing feedback signals representative of a back emf of the motor. A compressor speed circuit generates actual compressor speed signals for the feedback signals produced by the controller circuit. A duty cycle generator produces a speed controller signal as a function of the actual compressor speed signals, and the speed control signal is transmitted to the controller circuit for adjusting the speed of the electrically commutated motor driven compressor. Other motor controls, refrigeration systems and methods of control and operation are also disclosed.

28 Claims, 16 Drawing Sheets

MOTOR CONTROLS, REFRIGERATION SYSTEMS AND METHODS OF MOTOR OPERATION AND CONTROL

CROSS-REFERENCE TO RELATED APPLICATIONS

This application is a divisional of application Ser. No. 07/661,818, filed Feb. 27, 1991 (now U.S. Pat. No. 5,227,704), Which is a divisional of application Ser. No. 07/227,156, filed Aug. 2, 1988, (now abandoned), which is a continuation of copending application Ser. No. 07/015,409 filed Feb. 17, 1987 (now U.S. Pat. No. 4,763,347), which is a continuation-in-part of Ser. No. 06/463,147 filed Feb. 2, 1983 (now U.S. Pat. No. 4,654,566) which is a continuation-in-part of Ser. No. 06/412,421 filed Aug. 27, 1982 (now U.S. Pat. No. 4,449,079) which is a continuation of application Ser. No. 06/141,267 filed Apr. 17, 1980 (now abandoned) which is a continuation-in-part of application Ser. No. 06/077,656 filed Sep. 21, 1979 (now abandoned) which is a continuation-in-part of application Ser. No. 05/802,484 filed Jun. 1, 1977 (now U.S. Pat. No. 4,169,990) which is a continuation-in-part of application Ser. No. 05/729,761 filed Oct. 5, 1976 (now abandoned) which is a continuation-in-part of applications Ser. No. 05/482,409 filed Jun. 24, 1974 (now U.S. Pat. No. 4,005,347) and Ser. No. 05/482,407 filed Jun. 24, 1974 (now U.S. Pat. No. 4,015,182). Each of the aforementioned applications and patents are commonly assigned and the entire disclosures thereof are respectively incorporated by reference herein.

BACKGROUND OF THE INVENTION

FIELD OF THE INVENTION

This invention relates generally to rotating dynamoelectric machines and, more particularly, to such machines that receive power from a direct current or rectified alternating current power supply and that utilize electronic commutation means.

In conventional direct current rotating machines, commutation is essentially a mechanical switching operation to control the currents through the armature winding sections. This operation is accomplished in conventional machines with brushes and segmented commutators. In such constructions, the brushes wear and require frequent replacement. Sparking and its attendant generation of RF noise is also unavoidably present.

These disadvantages frequently prohibit use of DC motors in critical applications even though the use of such motors might otherwise be favored. Early attempts to provide brushless DC motors were mostly limited to: DC to AC inversion and, essentially, AC induction motor operation; use of rotor velocity for switching control but such control then was not effective at all rotor positions; or use of circuits having a larger number of switching devices with the result that the circuits for such devices were both complicated and expensive.

I have now devised simpler and less expensive DC motors and have recognized that different restrictions apply to electronically commutated motors than those that apply to mechanically commutated motors. Improved motor performance over the already good performance of conventional motor designs may be obtained by using a rotor position sensing system in conjunction with electronic switching, and a permanent magnet rotor in combination with a selected unconventional stator or armature winding arrangement for a direct current motor.

Motors embodying selected features of my invention are readily adapted for applications where space requirements are at a minimum. For example, such motors are readily adapted to drive the compressor of a recreational vehicle or automobile air conditioning system from the output of an alternator, or battery source. In such arrangements, an electronically commutated motor and compressor may both be sealed in a hermetic enclosure. In sealed arrangements, carbon pollution products are objectionable and use of brushless motors in such arrangements provides a distinct advantage over mechanical commutation. However, since the units are hermetically sealed, the reliability of the motor must be very good, and all parts of the motor must be such that refrigerant will neither damage the motor nor be damaged by motor components or the materials from which said components are made.

Conventionally, motor manufacturers have a first type of specialized equipment, processes, tools and dies, etc., for AC induction motors and a second type of the same for DC motors. To a great extent, such AC motor making, e.g., tools, etc., are not usable for present DC motor production. In accordance with another feature of the invention DC starters embodying the invention may be wound using conventional AC winding machinery.

Thus, another important advantage of the subject invention is the cost saving achieved both in manufacture and operation.

Electronic commutation may be achieved by either a bridge or star connection. The former improves copper winding utilization, while the latter offers the advantage of simplified electronics and by judicious selection of winding parameters, magnet size and electronics which controls the commutation cycle, there is obtained a reliable, highly efficient brushless DC motor having a desired speed-torque relationship which may be fabricated at a reasonable cost.

SUMMARY OF THE INVENTION

Accordingly, among the several objects and features of this invention are to provide improved motor controls, refrigeration systems and methods of operation and control which overcome the above discussed disadvantageous features, as well as others, of the prior art; to provide improved motor controls, refrigeration systems and methods of operation and control with protective features and capabilities; to provide improved motor controls, refrigeration systems and methods of operation and control to obtain enhanced performance in efficiency, torque, speed and precision of control; to provide improved motor controls, refrigeration systems and methods of operation and control which make motor starting and system starting more dependable and reliable; and to provide improved motor controls, refrigeration systems and methods of operation and control which are more economical and reliable.

In general, one form of the invention is a method of operating a brushless motor having a stationary assembly with at least two different energizable windings for producing spaced apart magnetic fields in time sequence, and a rotor adapted to rotate in response to the magnetic fields. The method includes the steps of simulating rotor position in accordance with the back emf condition of at least one winding, energizing a selected one of the windings in accordance with the simulated rotor position, sensing an underspeed condition when the motor speed is less than a minimum value for a length of time, and preventing energization of any of the windings when the motor speed is less than the minimum value for the length of time.

Generally, another form of the invention is an electrically commutated motor controller apparatus for controlling the speed of a variable speed motor compressor driven by an electrically commutated motor. The apparatus includes a controller circuit for controlling the speed of the motor. The controller circuit includes a circuit for producing feedback signals representative of a back emf of the motor. A compressor speed circuit generates actual compressor speed signals from the feedback signals produced by the controller circuit. A duty cycle generator produces a speed control signal as a function of the actual compressor speed signals, and the speed control signal is transmitted to the controller circuit for adjusting the speed of the electrically commutated motor driven compressor.

In general, a further form of the invention is a control system for a brushless motor for energization from a voltage for the motor, the motor having a stator with windings and a rotor mounted for rotation relative to the stator, the rotor having a plurality of permanent magnet poles. The control system includes circuitry for generating an input signal corresponding to the presence of the rotor at one of a plurality of predetermined rotary positions with respect to the stator and electrically controllable switch means connected to the windings to control the flow of current therethrough. Further included is an electronic control circuit responsive to the input signal for controlling in a closed loop running mode the switch means to commutate the windings of the motor after receipt of the input signal. The electronic control circuit is also responsive to the speed of the motor to start the motor in a starting mode by controlling the switch means to commutate the windings at an increasing rate, the rate determined as a function of the voltage applied to the motor, and then to shift commutation to the running mode once the motor reaches a predetermined speed.

A yet further form of the invention is a refrigeration system for use with a power source and including a compressor assembly having a compressor mechanism for circulating a refrigerant through an evaporator. A motor is coupled with the compressor mechanism and has a stationary armature core, at least one excitable winding disposed on the armature core to produce at least one magnetic field and having at least one back emf, and a permanent magnet rotor adapted to rotate in response to the at least one magnetic field produced by the winding. An electronic commutating circuit is coupled to the power source for selectively switching a source voltage to energize in sequence different portions of the winding, the electronic commutating means including means for producing a signal representative of the back emf of the motor winding. A compressor speed circuit is provided for generating an actual compressor speed output from the signal representative of the back emf. A temperature control provides an output indicative of the desired temperature to be maintained by the refrigeration system. Regulator means responds to the temperature control output and the actual compressor speed output for controlling the stator winding energization in accordance with the desired temperature.

A further method form of the invention is a method of operating a control system for an electronically commutated motor adapted to be energized from a source of voltage and including a stationary assembly having a plurality of winding stages adapted to be electronically commutated in at least one preselected sequence, and a rotatable assembly associated in selective magnetic coupling relation with tile winding stages. The method includes electronically commutating at least some of the winding stages of the electronically commutated motor in response to control signals by applying the voltage thereto in the at least one preselected sequence to effect the energization of the electronically commutated motor and the rotation of the rotatable assembly. Further steps include establishing a variable time interval between commutations as a decreasing function of the voltage applied to the motor, producing in a start mode the control signals at the interval so established, and shifting commutation to another mode once the time interval decreases to a predetermined amount.

The invention comprehends other inventive motor controls, refrigeration systems and methods of operation and control which are also described herein.

BRIEF DESCRIPTION OF THE DRAWINGS

Other objects of the present invention and their attendant advantages will become readily apparent from the following description taken in conjunction with the accompanying figures in which like reference characters are used to describe like parts throughout the several views.

DESCRIPTION OF THE PREFERRED EMBODIMENTS

Figure 1:
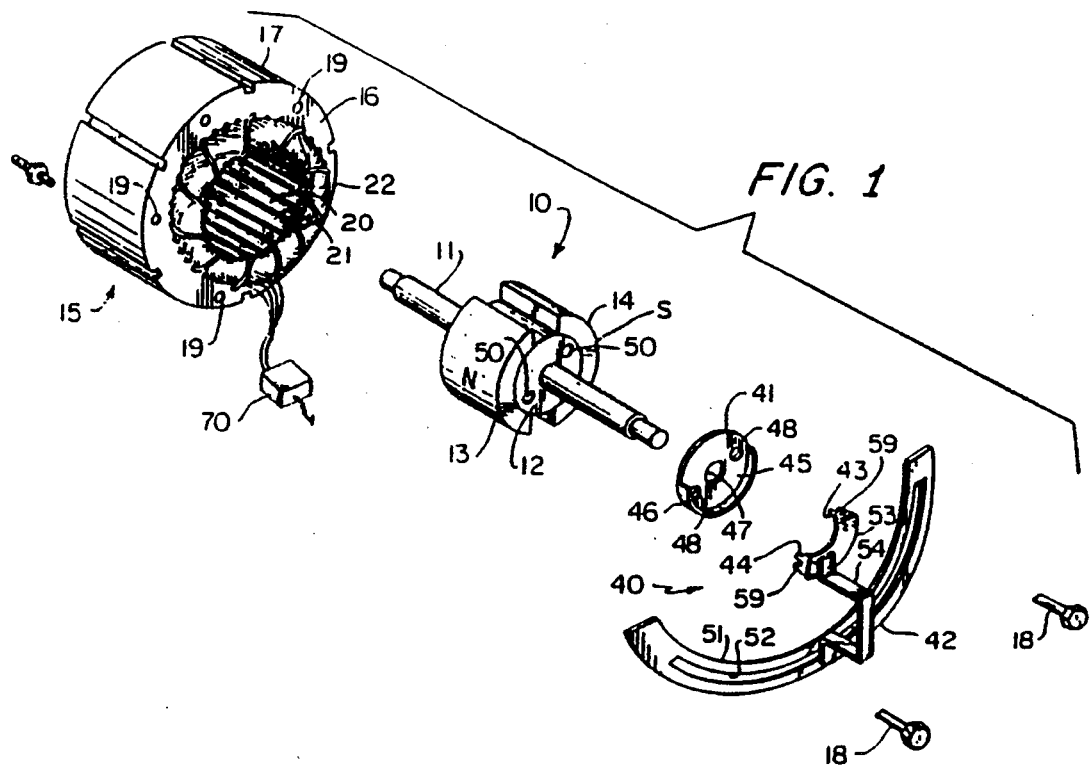
FIG. 1 is an exploded, perspective view of the main elements of a brushless DC motor embodying teachings of the present invention in one form thereof.

Referring to FIG. 1, there is illustrated the component parts of a brushless DC motor of one type that embodies the present invention in one preferred form. A permanent magnet rotor 10 is mounted on a shaft 11 which is rotatably supported by conventional not shown bearing means within any desired not shown housing. The rotor 10 is magnetized across its diameter in a manner known to the art. In the illustrated embodiment, the rotor 10 comprises a solid magnetic steel core 12 and a pair of arcuate magnets 13 and 14 disposed on the periphery of the core in diametrically opposed relationship. The magnets 13 and 14 were ceramic magnets, but it will be understood that they could be cobalt samarium, Alnico, or any other available type of magnet material. The primary selection criteria are expense and physical size of the motor. The arc length of each ceramic magnet is preferably between 135 electrical degrees and 160 electrical degrees, but could be as much as 180 electrical degrees and as low as approximately 90 electrical degrees. Arc lengths of less than 120 electrical degrees would generally result in poor efficiency with the winding arrangement specifically shown in FIG. 2, and are thus not preferred with such arrangement.

When the arc lengths are on the order of 90 electrical degrees, the windings would be made relatively more concentrated. For example, in a 24 slot stator used for two pole operation, the outer coils of each coil group preferably would span about 10 slots. In addition, each coil group preferably would include three coils per coil group spanning 9, 7 and 5 teeth, respectively. This type of arrangement would provide optimized efficiency characteristics of such motor.

The stationary armature assembly 15 includes a relatively low reluctance magnetic member 16 which is formed of a plurality of like stator laminations 17 assembled in juxtaposed relationship. The laminations may be held together by a plurality of stator through-bolts 18, only two of which are fragmentarily shown, that pass through coaxially positioned through-bolt holes 19 in the stator laminations. Alternatively, the core laminations may be welded, keyed, adhesively bonded together, or merely held together by the windings, all as will be understood by persons skilled in the art.

Each lamination includes a plurality of teeth 20 along its interior bore such that the assembled laminations provide a plurality of axially extending slots 21 within which the stator windings 22 are disposed.

Windings 22 may be wound by means of conventional induction motor winding machinery. Thus, the winding turns may be wound directly in the core slots; or the windings may be wound into a coil receiver and subsequently be axially inserted into the core slots, for example, with equipment of the type shown and described in U.S. Pat. Nos. 3,522,650; 3,324,536; 3,797,105 or 3,732,897, the disclosures of which are incorporated herein by reference.

Preferably, each winding has a spread of 90 electrical degrees across the stator slots so as to generate mutually perpendicular magnetic fields when energized. The winding end turns extend beyond the core end faces, and the winding ends or leads are brought out and connected separately to the control circuit and the associated switching means.

Figure 2:
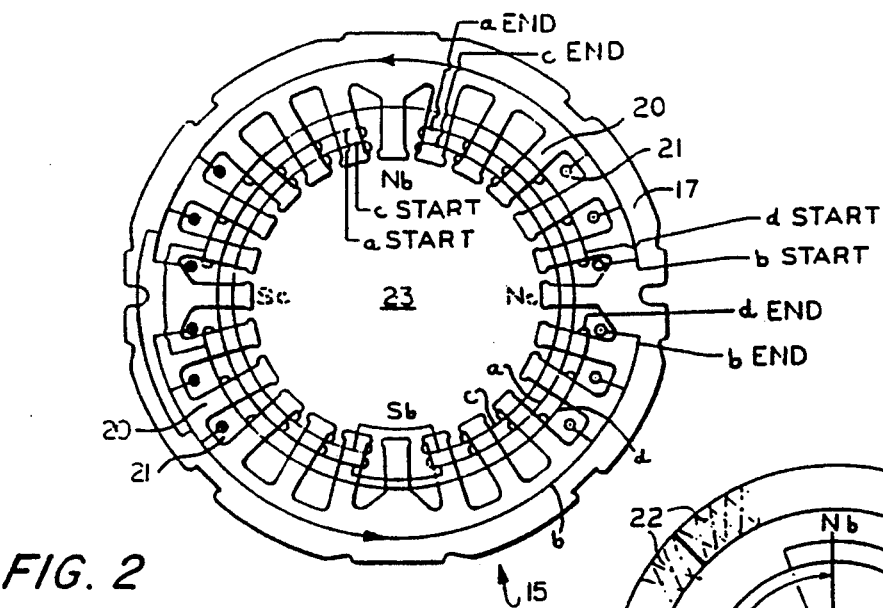
FIG. 2 is a diagrammatic front elevational view of the stator or armature core of FIG. 1, diagrammatically illustrating a selected winding arrangement for the motor of FIG. 1.

Referring to FIG. 2, there is illustrated an exemplary winding arrangement for a one twentieth horsepower, 3000 rpm electronically commutated DC motor embodying principles of my invention. The selected lamination or punching includes twenty-four slots, and fifty-four bifilar turns are provided for each winding. With the oppositely disposed pairs of windings wound bifilarly, I provide four windings a, b, c, d. Windings a and c are bifilar wound and occupy the six uppermost and six lowermost slots 21, as viewed in the drawing, and are shown as being included by the dash lines. Windings b and d are bifilar wound, and occupy the six left-hand and six right-hand slots, as viewed in FIG. 2. The stator 17 is wound with a winding turn distribution of 10 turns, 10 turns, 7 turns, from outermost to innermost coil, respectively, for each coil group shown in FIG. 2. Each winding is shown as including two coil groups, of course. The particular number of turns in a slot for each winding and the resultant distribution could be varied according to the desired motor characteristics to be obtained. For example, the outermost coils of each co group could be maximized in number while the innermost coil turns are minimized so as to concentrate the winding. When the winding is so concentrated, a higher average torque will result (assuming stator core, rotor construction winding resistance, and total turn count is held constant), but the switching point will be more critical, the amount of advancement may have to be changed and minimum locked rotor torque will be reduced. Also, dips in torque (during running and standstill) would be of greater amplitude, but of less duration.

As shown in FIG. 2, the turns of each winding are concentrically disposed in a given pair of slots with the desired number of turns in each slot. The winding of course continues in the next pair of slots, and the desired number of slots or teeth are spanned which in the illustrated embodiment is eleven teeth and providing a spread of, for example, 90 electrical degrees for each winding and enabling the windings to sequentially generate mutually perpendicular magnetic fields when sequentially energized. By using bifilar strands, two windings are wound simultaneously and one end of each strand may then be conveniently grounded to provide a star winding configuration. It is again noted that the arrangement is readily adapted for winding and placement by conventional winding machinery used for winding AC motors.

It will be noted that in FIG. 2, the winding b has been illustrated somewhat differently than windings a, c, and d. Winding b has been shown to illustrate the direction of current flow therein during at least one commutation period and arrows have been used to indicate the direction of current flow in the end turn portions of winding b. On the other hand, dots and crosses (enclosed within circles) have been used to illustrate the direction of current flow in the respective turns of winding b that are disposed within the magnetic core slots. With the notation used in FIG. 2, a dot would indicate that current is flowing upwardly out of the plane of the drawing, and crosses indicate current flowing downwardly relative to the plane of the drawing. With current flow as indicated by the dots and crosses in FIG. 2, winding b would establish north and south poles oriented as represented by the letters $N_b$ and $S_b$ in FIG. 2.

Figure 3:
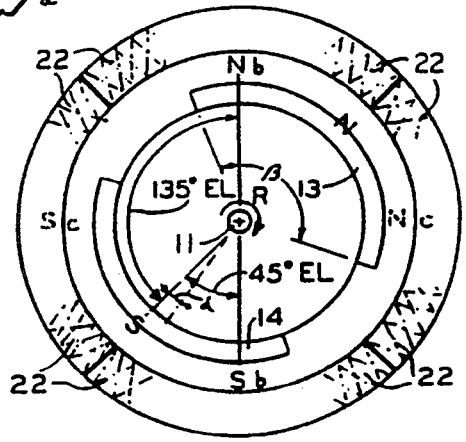
FIG. 3 is a diagrammatic representation of parts of the motor of FIG. 1 showing the position of the rotor magnets relative to the armature windings at the instant of turn-on of one of the windings, with a zero electrical degree advance setting.

The stationary armature assembly has an axial bore 23 within which is received the rotor 10. The arcuate magnets 13 and 14 are disposed (e.g., by an adhesive such as an epoxy resin) on the outer surfaces of the low reluctance core 12 (which may be laminated but does not need to be) with North-South polarizations as indicated in FIG. 3. Magnetization is in the radial direction with radial thickness selected to produce the desired magnetomotive force (for a given magnet material) or to assure that no irreversible demagnetization occurs from the fields produced by the current in the stator windings during stalled conditions.

It will be understood that although magnets 13 and 14 have been described as being adhesively bonded to the outer peripheral surface of the core 12, it is important only that fields of opposite polarity be established by the rotor assembly. Thus, bar type magnets (or magnets of any other desired shape) may be utilized in the fabrication of rotor assemblies for motors embodying the present invention. The magnets (when permanent magnets are used) may be disposed within a magnetic iron cage structure or fabricated in any other desired manner. In fact, an excited rotor wherein the north and south poles are established by current carrying conductors may also be utilized. In the latter case, of course, slip rings or any other suitable means would be used to interconnect the rotor windings with a source of excitation current. The axial length of the magnets is dependent on the total flux desired. The instantaneous torque curves and the net torque output is dependent on the magnet arc or arc length beta (B) of the magnet which, as hereinbefore noted, should be preferably constrained within 135 electrical degrees and 160 electrical degrees, for greatest efficiency.

Adjacent one end of the rotor is positioned a shaft position sensor assembly 40 comprising a shutter 41 and bracket 42 for supporting a pair of optical interrupter modules, i.e., optical light coupling sensors 43 and 44. Shutter 41 may be formed of any optically opaque (at the pertinent wave length) material or coated material such as, for example, aluminum (brass, steel, etc.), and includes a flat disc shape element 45 having a shutter flange 46 extending along the periphery of the disc element for an arcuate distance of approximately 180 electrical degrees. The disc element includes a central opening 47 slightly larger in diameter than the diameter of the rotor shaft 11 so that it may be conveniently passed over the rotor shaft and mounted flush with the end face of the solid steel core 12. To this end, a pair of bolt receiving openings 48 are provided for receiving mounting bolts (not shown) adapted to be threaded into pre-threaded openings 50 provided in the core 12. Of course, as should be readily apparent, other suitable arrangements could be utilized for mounting the shutter to the rotor, so long as flange 46 extends outwardly from the rotor and is cooperatively associated with sensors 43 and 44 to effect generation of rotor position reference signals in response to the position of the rotor relative to the stator.

Figure 4:
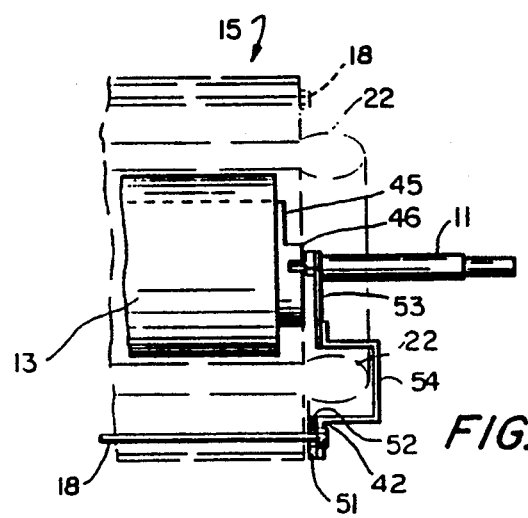
FIG. 4 is a fragmentary, side elevational view, partly in cross-section, better showing the physical inter-relationship of the support bracket assembly in the motor assembly of FIG. 1.

As shown in FIGS. 1 and 4, bracket 42 comprises a first arcuate shaped segment 51 having an elongated slot 52 along its length. Slot 52 permits the bracket to be adjustably attached to the stator laminations 17 by means of the stator through bolts. A second arcuate shaped segment 53 is supported radially inward of the first segment by means of an interconnecting U-shaped strap or arm member 54. As more clearly shown in FIG. 4, strap 54 is shaped to pass over the end turns and support the sensors 43 and 44 with a 90° spatial orientation within the end turns of the stator windings and in cooperative relationship with the outward extending shutter flange 46. It should be noted that the sensors are supported within the outermost axial dimension of the winding end turns as well as within the radial dimension thus minimizing the axial length of the motor, the dimension of the strap adding very little to the overall axial length.

Figure 5A:
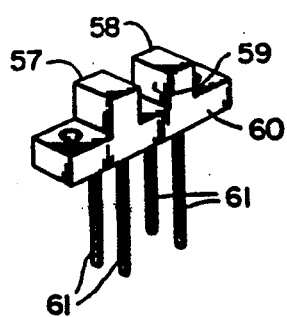
FIGS. 5A and 5B illustrate the construction and equivalent electrical circuit, respectively, of a light sensitive element used as a shaft position sensing element in the assembly of FIG. 1.
Figure 5B:
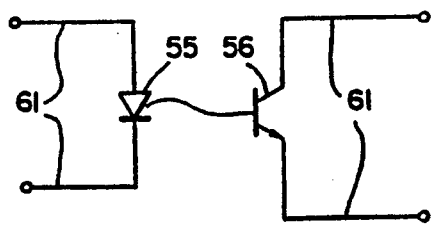

Referring to FIGS. 5A and 5B, there is illustrated a typical mechanical and electrical configuration of an optical sensor adaptable for use with the present invention. Such sensors are conventional commercial devices and may be, for example, General Electric H13A2 optical couplers. As shown, the coupler includes a source of light energy 55 which may be a light emitting diode and a light sensor 56 which may be a light sensitive phototransistor in light coupling relationship with the light emitting diode. Diode 55 and phototransistor 56 are formed in separate blocks 57 and 58, respectively, separated by a channel 59 and mounted to a supporting base 60. Base 60 of each sensor is secured at opposite ends of supporting segment 53 such that the sensors are spaced from each other by an arcuate distance of 90 electrical degrees. Convenient openings are provided in the segment to allow the terminal conductors 61 of the sensors to pass freely therethrough.

Commutation of the stator windings is achieved by means of a solid state control circuit 70 comprising NOR gates and transistor switches and drivers activated in response to signals from the shaft position sensors. The circuit may be of the type illustrated in FIGS. 6 and 7 where a star winding configuration is employed or of the type illustrated in FIGS. 7, 9 and 10 where a bridge arrangement is employed.

In either case, current switching in the stator windings is preselectively set by the relative positioning of the sensor so that commutation of the stator winding is advanced as is hereinafter explained.

Briefly summarizing operation of the circuit, it will be apparent from the several schematic figures that the control circuit receives the output of the light sensitive shaft position sensor assembly 40 to derive switching signals for commutation of the stator windings. To this end, the outputs of the sensors 43 and 44 produce two position signals indicative of the position of rotor 10 with respect to the fixed position of the stator windings. The two position signals are applied to a first signal conditioning circuit 70' in FIG. 6 which develops four control signals which correspond to those positions of the rotor while (1) shutter flange 46 is passing through channel 59 of sensor 43 thereby blocking its photosensor; (2) shutter flange 46 is passing through channel 59 of both sensors 43 and 44 thereby blocking both photosensors; (3) shutter flange 46 is passing through channel 59 of sensor 44 and blocks the photosensor of sensor 44 but has unblocked the photosensor of sensor 43; and (4) shutter flange 46 is clear of both sensors. In this manner, the shutter operates to block or intercept the light from the source of light energy, of each optical coupler during one half of each revolution of the rotor, while permitting passage of light energy from each source of light to its associated photosensor during the remaining half of the rotor revolution. However, by supporting the sensors in a 90° spatial relationship, the on-off combination of the sensor provides four position control signals, while the adjustable bracket assembly provides a convenient means for preselectively advancing the commutation of the windings and aid the build-up of current in the winding being commutated and obtain a desired speed-torque relationship with greater efficiency.

Figure 7:
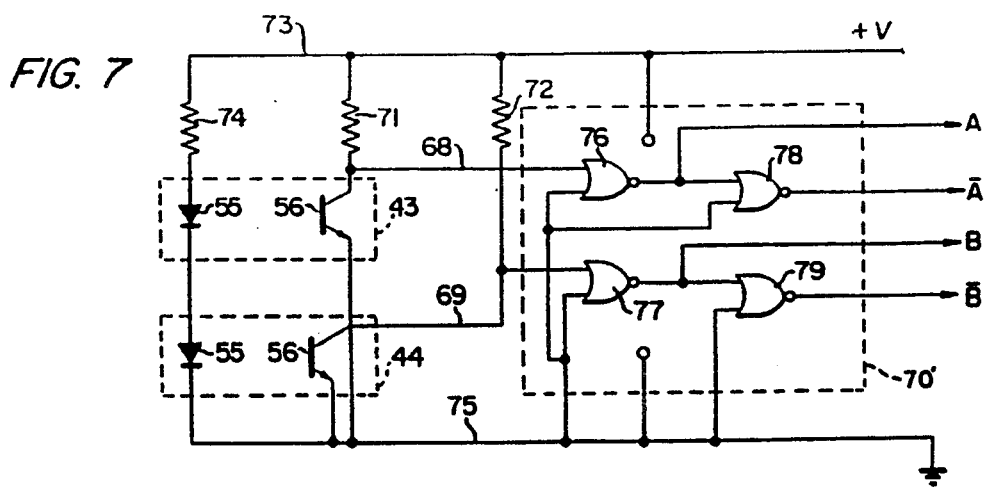
FIG. 7 is a schematic diagram of the signal conditioning circuit, shown in block form in FIG. 6, for producing position control signals indicative of the rotational position of the rotor of FIG. 1.

Referring to FIG. 7, it will be understood that the output of each coupler 43, 44 is high when the energy received from the LED 55 is prevented from exciting the associated phototransistor 56, i.e., when shutter flange 46 passes between the LED and the phototransistor. As will be understood from considering FIG. 7, a first position signal occurs whenever the coupler 43 is blocked and this signal appears on line 68. A second position signal occurs whenever coupler 44 is blocked and this signal appears on line 69.

As hereinbefore noted, each coupler consists of an LED 55 and a phototransistor 56. The collector of each phototransistor is independently connected through an associated resistor 71 or 72 to a positive bus line 73. Diodes 55 are connected in series and in turn through biasing resistor 74 to the positive bus 73. The emitters of the phototransistors and the series connected diodes are returned to a common ground line 75.

The first signal conditioning circuit 70' includes four NOR gates arranged to develop the four position control signals A, $\overline{A}$ (not A), B, and $\overline{B}$ (not B) which are indicative of the rotational position of the rotor 10 (within a ninety degree region) and which are utilized to control current switching in the stator windings. To this end, one input of each NOR gate 76 and 77 is connected to lines 68 and 69, respectively, and the other inputs of each NOR gate 76 and 77 are returned to ground line 75. The outputs of NOR gates 76 and 77 establish the A and B position control signals applied to the second signal conditioning circuit. The A and B control signals are also applied respectively, to one of the input terminals of NOR gates 78 and 79, the output of which comprises the $\overline{A}$ (logic complement not A) and $\overline{B}$ (logic complement not B) position control signals. The other input of each NOR gate 78 and 79 is grounded. The duration and sequence of the signals A, $\overline{A}$, B, and $\overline{B}$ are schematically depicted in the upper portion of FIG. 8.

Figure 6:
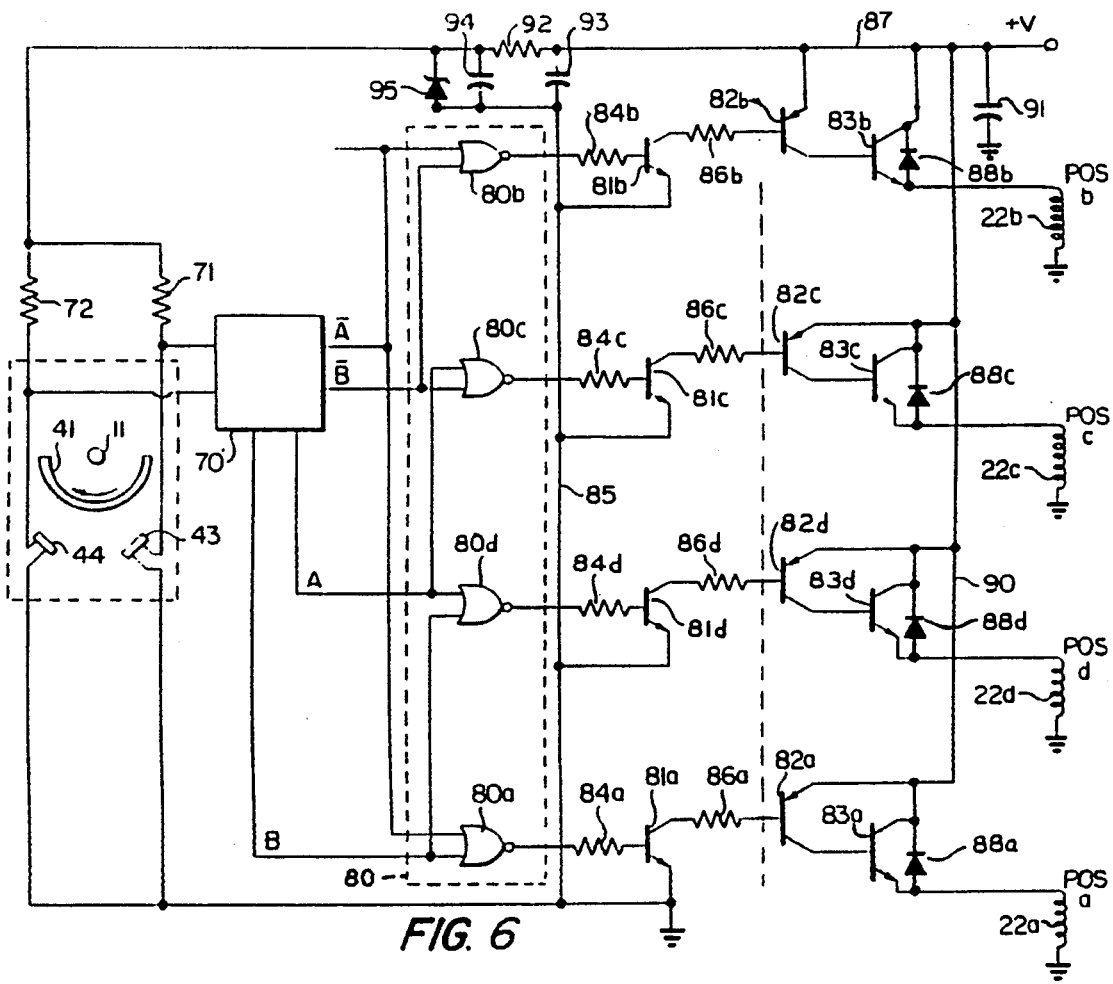
FIG. 6 is a schematic diagram of a solid state commutating circuit embodying features of the present invention and arranged for switching the windings of the motor of FIG. 1 when such windings are connected in a star configuration.

The four position control signals A, $\overline{A}$, B and $\overline{B}$ are applied to the second signal conditioning circuit 80 shown in detail in FIG. 6. The function of the second signal conditioning circuit is to produce four switching signals for sequentially switching the associated stator windings 22a, 22b, 22c and 22d. To this end, each winding is associated with a separate signal channel including its own NOR gate 80, transistor 81 and driving stage comprising transistors 82 and 83. Operation of each channel is identical and to avoid duplication, the description will be limited to the operation of a single channel. The channel for the "a" winding is referred to as the "a" channel and the associated compound in that channel have each numerical reference character followed by the letter "a" to signify its association with that channel. Thus, the "a" channel controls switching of winding "a", the "b" channel controls switching of winding "b", and so forth.

Channel "a" is shown as the lowermost channel of the second signal conditioning circuit in FIG. 6. NOR gate 80a has its two inputs connected to receive the $\overline{A}$ and B inputs from NOR gates 78 and 77. Likewise, each of the other channels are arranged to receive two position control signals from the first signal conditioning circuit 70 such that the four channels produce four successive switching pulses for each revolution of the rotor, as best understood by referring to the lower half of FIG. 8. In this portion of FIG. 8, the duration and sequence of the signals A+B, $\overline{A}$+B, $\overline{A}$+$\overline{B}$, and A+$\overline{B}$ are schematically depicted.

Logic is performed with two inputs for each gate. The gates are connected in such a way that when the output of one NOR gate is a 1, the outputs of the other NOR gates are at zero. Gate 80a, for example, has a 1 output when the $\overline{A}$ and B inputs are both at zero. This occurs just once in a revolution of time shutter 41. Similarly, for gate 80b, its output is 1 when the $\overline{A}$ and $\overline{B}$ inputs are at zero. This, again, is a singular combination in each revolution. Gates 80c and 80d are in like manner connected to A, $\overline{B}$ and A, B inputs, respectively.

The switching signals from each NOR gate 80 are amplified by an associated transistor 81 to which the switching signal is applied through a base resistor 84. The output of each transistor 81 is directed to the base circuits of a power switch set comprising transistors 82 and 83 which are switched to effect energization of the stator windings 22a-22d in a predetermined timed relation. Transistor 81 comprises an NPN transistor, the emitter of which is grounded through line 85. The collector of each transistor 81 is connected through a resistor 86 to the base of a PNP transist 82. The collector and emitter of each transistor 82 are connected, respectively, to the base and collector of the associated transistor 83 forming a conventional modified Darlington configuration. For larger motors, larger power transistors 83 or the paralleling of two or more transistors may be desired.

Each stator winding is connected through the collector-emitter junction of its associated transistor 83 to the positive bus 87. A protective diode 88 is connected across the emitter-collector of each transistor 83 to provide a currant path from the associated winding to the positive bus line 87. To this end, the anode of each diode 88 is connected to the ungrounded side of the associated winding 22 and the emitter of transistor 83 to insure that the polarity of the diode is such as to allow the return of energy released by the decaying magnetic field of a winding when it is deenergized. The back current generated by the decaying magnetic field is shunted past the transistor 83 through line 90 causing the charging of capacitor 91 which is connected across the positive bus line and ground. The energy stored in capacitor 91 will be returned to the system upon discharge of the capacitor when the next winding is turned on resulting in an overall increase in efficiency of the motor. The improvement in efficiency may be as high as 10%.

The protective circuit formed by each diode 88 and capacitor 91 is equally effective for rectified AC and battery supplies. It should be noted that for a rectified AC line, the diodes associated with the supply source are switched in such direction as to allow current to flow through the motor, but not back to the line. Thus, the capacitor 91 serves to store energy from the switched windings. Capacitor 91 could be replaced by a zener diode which would absorb and dissipate the recovered energy as heat. While such an arrangement could provide protection to the transistors 83a, b, c, d, it would not provide for improved efficiency because the energy would be dissipated rather than being returned to the system.

Resistor 92 connected in positive bus line 87, together with capacitors 93, 94 and a 15-volt zener diode 95 (for a nominal applied average voltage of 12 volts) provides a protective filter network for the circuit components against the possibility of line 87 being raised to a voltage great enough to destroy the solid state components which could occur, for example, if the motor is run off a battery charger that could supply more than eighteen volt peaks.

Stator windings 22a–22d of FIG. 7 are wound bifilarly and are arranged in a star configuration with one end of each winding tied to a common ground. This provides an efficient arrangement which enables the windings to be switched on and off individual with a minimum of electronics and which enables the inductive energy of a switched winding to be recovered. In this connection, when winding 22a is turned off, for example, the decaying magnetic field induces a current in the companion conductor of winding 22c due to the bifilar winding arrangement and the resultant transformer action. The feedback diodes 88 around each switching transistor provide a path for current associated with trapped inductive energy and protect the transistor, while capacitor 91 enables this energy to be recovered. This arrangement provides for relative utilization of the windings in a slot of only 50%. To provide for full utilization of the windings, providing for even more efficient utilization of winding material, resort may be made to the bridge circuit arrangement of FIGS. 9 and 10.

Figure 9:
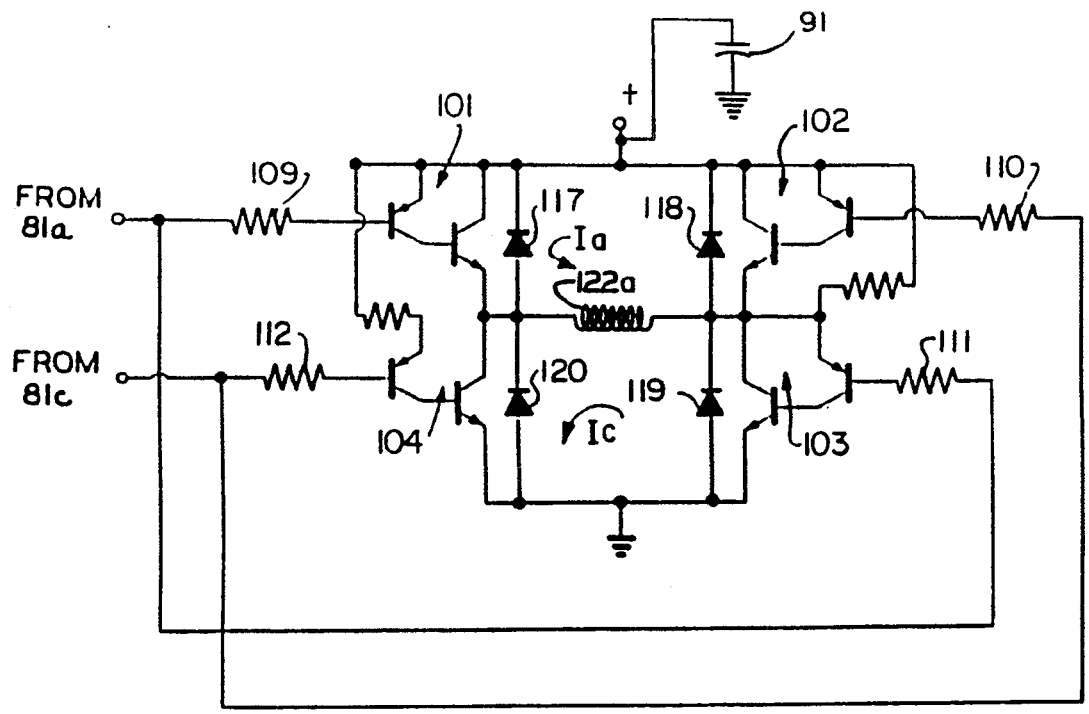
FIGS 9 and 10 are schematic diagrams of a solid state commutating circuit embodying features of the present invention, and arranged for switching the windings of the motor of FIG. 1 when such windings are connected in a bridge configuration.
Figure 10:
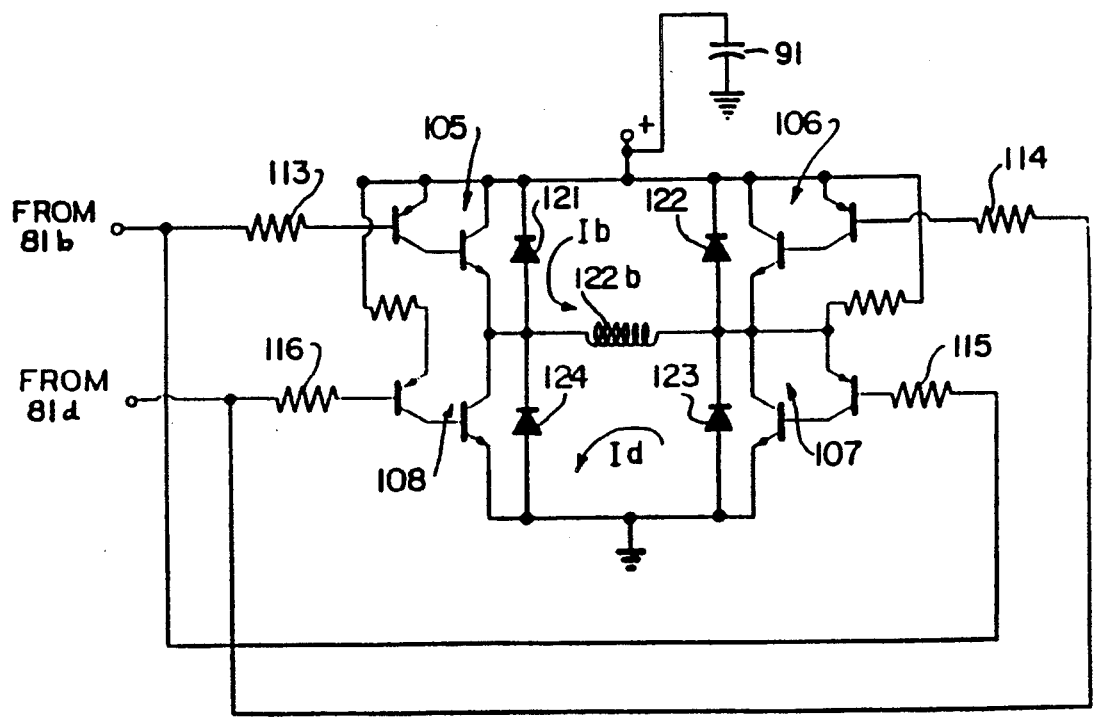

In accordance with the arrangement shown in FIGS. 9 and 10, the stator windings 122a and 122b are wound in the same manner as the stator windings 22a and 22b of the star configuration of FIG. 6. Thus, instead of using bifilar strands as was done with windings 22a, 22c, only single strands are employed and a particular winding is switched in by switching of a pair of transistors. To this end, four power switch sets 101–108 are provided for each pair of windings. Each power set comprises a pair of transistors arranged in a Darlington configuration. The base of the input transistor of each power set is connected through its associated base resistor 109–116 to the output of a transistor amplifier 81 of one of the channels in a manner shown, for example, in FIG. 6. The "a" channel output of transistor 81a is connected to the input of power switch set 101 and 103, the "b" channel to sets 105 and 107, the "c" channel to sets 102 and 104 and the "d" channel to sets 106 and 108. Winding 122a is energized when current $I_a$ flows with the power sets 101 and 103 turned on. Winding 122a, in effect, acts like winding 22c of FIGS. 2 and 6 when power sets 102 and 104 are turned on and current $I_c$ flows. The bridge circuit for switching in winding 122b operates in a like manner when currents $I_b$ and $I_d$ flow. Each transistor is provided with a protective diode 117–124 connected across the emitter-collect terminals and poled to provide a path for the current associated with stored inductive energy which is released when the transistors are turned off.

The aforedescribed circuit arrangements provide a relatively simple, but highly efficient and economical means for controlling the commutation of a motor embodying the present invention.

Advanced timing angle (or advancement of commutation) is defined in accordance with FIG. 3. Zero advance would exist if a winding was turned on when the magnetic center of a rotor magnet was moving thereward and at the instant that the magnetic center of the rotor was 135 electrical degrees from alignment with the axis of the magnetic pole established thereby. This would be the theoretical optimum. However, switching of the winding 10 electrical degrees before this theoretical optimum position is reached, constitutes a 10 degree advancement of commutation. The preferred amount of advancement of the timing angle is associated with the L/R time constant of the winding. At 0 electrical degrees advance, the current in the winding builds up too slowly to achieve maximum possible torque throughout its full "on" time. Advancing the commutation angle, however, takes advantage of the fact that the generated back emf is less during incomplete coupling, i.e., when the polar axes of the rotor and winding are not in exact alignment, and current build-up time and torque development can, therefore, be improved. Too great an advance incites current overshoots with consequent adverse effects on efficiency, but the optimum setting of the advance depends to some extent on the desired speed and torque operating points of the particular motor. Timing angle is preselectively adjusted by peripheral rotation of bracket 42, which positions the light coupling sensors 43 and 44 with relation to shutter flange 46.

With continued reference to FIG. 3, the center of the north and south magnetic poles established by winding 22b of FIG. 2 have been indicated by the reference notation Nb and Sb, respectively. The general location of the polar axes or centers of magnets 13, 14, on the other hand, are represented by the notation N, S. It is to be understood that north and south poles Nb, Sb, are established by winding 22b when it is energized as indicated in FIG. 2.

During motor operation, windings 22a, 22b, 22c, and 22d are commutated in sequence; and as the poles Nb, Sb (associated with winding 22b) disappear; the poles Nc, Sc (associated with winding 22c) appear. It will be noted from FIG. 3 that the center of magnetic poles S of magnet 14 is positioned 45 electrical degrees past pole Sb. In theory, winding 22b should be switched on at this instant to establish poles Nb, Sb; and winding 22b should remain energized for ninety electrical degrees. Then, winding 22b would be switched off and winding 22c would be switched on, assuming clockwise rotation of the rotor as indicated by arrow R in FIG. 3.

I have found that better performance results when I effect commutation of the windings in advance of the theoretically desirable switching point or angle by a predetermined angle ($\alpha$) alpha (in electrical degrees).

For the embodiment having a winding arrangement as described hereinabove, the angle alpha equaled about twenty electrical degrees. Thus, winding 22a was de-energized, and winding 22b was energized to establish poles Nb, Sb when the axis of poles Sb of magnet 14 was about 135 plus 20 or 155 electrical degrees therefrom. Ninety electrical degrees later, winding 22b was de-energized and winding 22c was energized so as to establish poles Nc, Sc. This then continues of course for the four windings 22a, b, c, d, as will be understood.

Figure 11A:
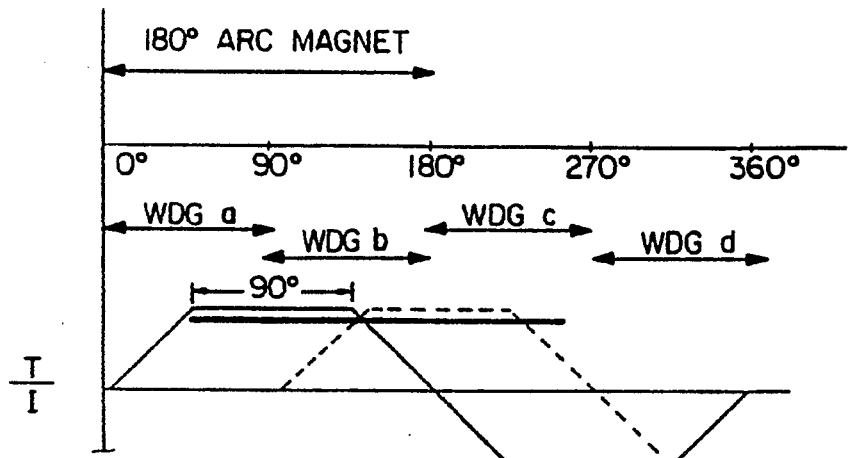
FIGS 11A–C are graphical representations of torque per ampere as a function of rotor position, magnet arc length and distribution of turns for magnet arc lengths of 180 electrical degrees, 160 electrical degrees, and 135 electrical degrees, respectively; and schematically illustrate different arc lengths of rotor magnet arc lengths.
Figure 11A:
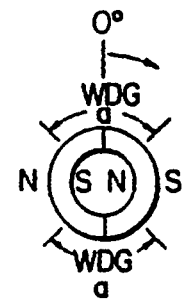

Although oppositely located winding sections can be coupled simultaneously by opposing magnets of the rotor, all turns of a given winding may not be fully coupled due to the distributed nature of the windings and foreshortening of the rotor magnets. Because of this the output torque per ampere input to the stator or armature winding (T/I) is a function of rotor position and the number of effective winding turns. FIGS. 11A, B, C reveal the effect on the ratio T/I when magnets of different arc lengths are used with a given stator or armature configuration.

FIG. 11A represents a plot of T/I when the magnet arc length is 180 electrical degrees and the windings 22a, b, c, d have the same number of turns in each slot. The solid trapezoidal curve shows instantaneous torque per ampere for a constant value of current flowing in winding 22a if that winding is energized or left "on" for a full revolution of the rotor. The dashed trapezoid curve is similarly drawn for winding 22b to represent its instantaneous torque per ampere contribution. The heavy solid curve displays a net effect of winding 22a being "on" for 90 electrical degrees only, and winding 22b being "on" for 90 electrical degrees and so on for windings 22c and 22d. The heavy solid curve is displaced from the other curves for illustration convenience.

Figure 11B:
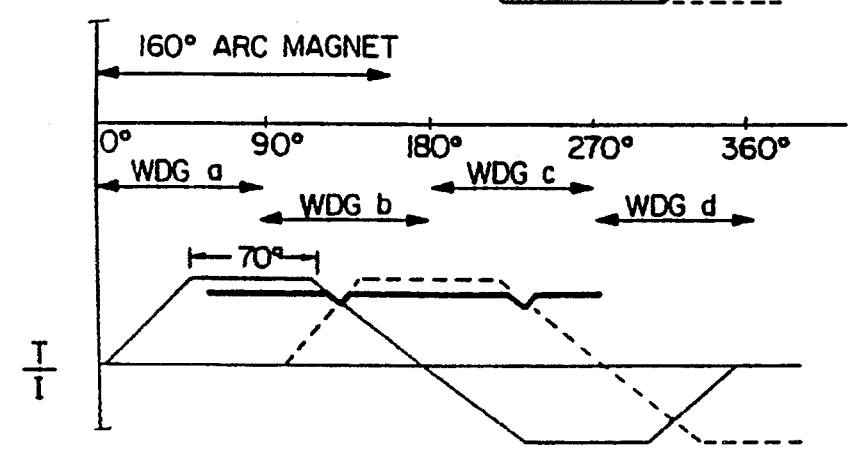
Figure 11B:
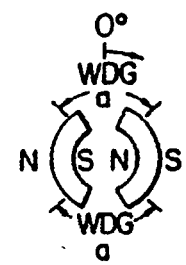
Figure 11C:
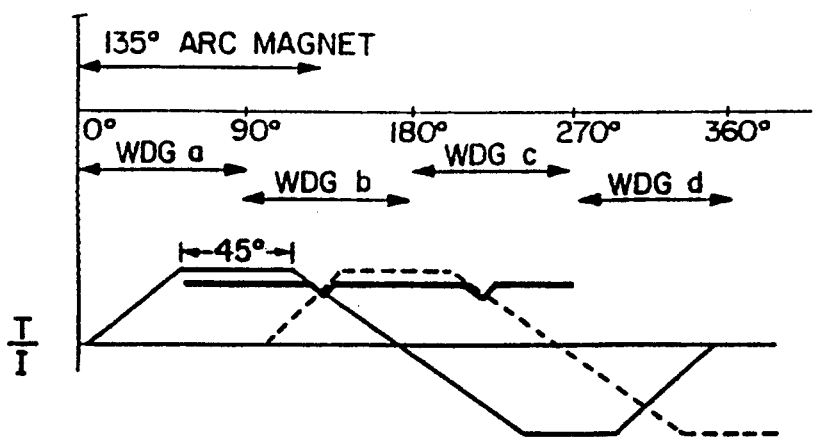
Figure 11C:
Figure 12:
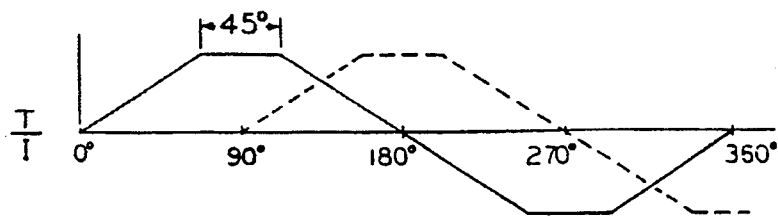
FIGS. 12–15 are plots of torque per ampere as a function of rotor position (in electrical degrees) for different amounts or extents of spreads (or relative concentration) of stator windings.
Figure 13:
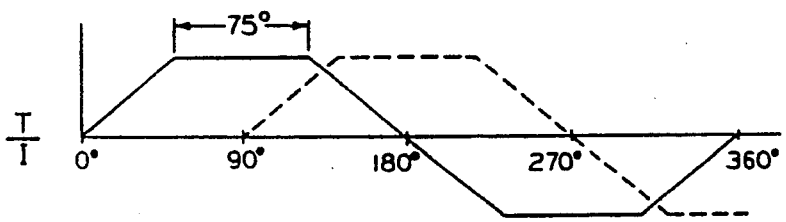
Figure 14:
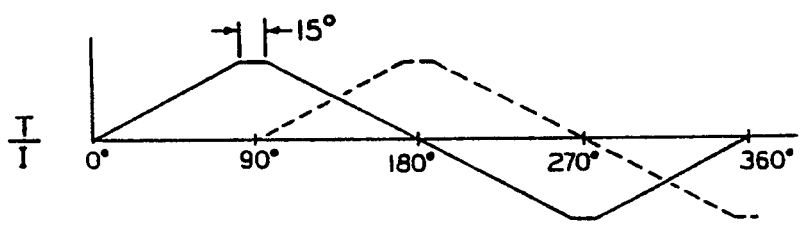
Figure 15:
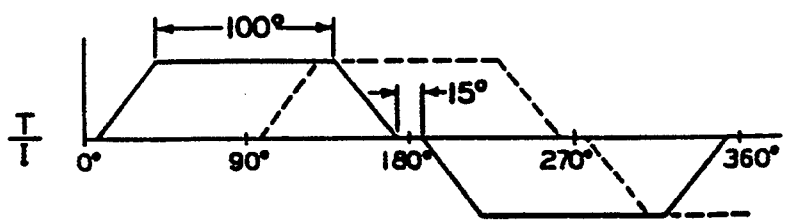

Winding 22a is turned on at approximately 45 electrical degrees after the polar axes of the rotor magnets have passed the center of the poles to be established by winding 22a. The distributed windings are thus seen to introduce a trapezoidal shape to the instantaneous torque in contrast to the theoretical ideal square shape which would otherwise be obtained for an ideal case utilizing concentrated windings. It is to be noted that each of FIGS. 11A-C schematically depict the arcuate length of various rotor magnets as well as the "spread" of the winding conductors of winding 22a. "Spread" is used to indicate the angular expanse of adjacent stator slots that carry the conductors of a given winding. Thus, in FIG. 2, each winding has two groups of conductors, disposed in slots, and each group has a spread of ninety electrical degrees (six slots).

FIG. 11B illustrates the torque per ampere developed as a function of rotor position, utilizing an arc magnet having an arc length of 160 electrical degrees. The windings are, again assumed to be ideally or uniformly distributed and winding current to be at a constant value. The instantaneous torque per ampere as a function of rotor position curve retains its trapezoidal shape, as in FIG. 11A, but the build-up is slower and the time at maximum torque is shorter. The net or average torque, however, is only slightly reduced. These effects are emphasized still further for a magnet having an arc length of 135 electrical degrees as revealed by FIG. 11C.

In taking into account winding inductance and rotor speed of motors constructed as taught herein, it was observed that optimum torque at rated load occurred when the windings were energized in advance by approximately 20 electrical degrees. Because of this, magnet arc length can be reduced from 180 electrical degrees to 160 electrical degrees with essentially no loss in motor perform The value of 135 electrical degrees for magnet arc length is, also, significant in that it represents an optimum choice from a manufacturing standpoint in that best yields for processes used to produce ferrite magnets result when arc segments are normally at 135 mechanical degrees (it being noted that mechanical degrees are equal to electrical degrees for two-pole motors). Moreover, magnets having arc lengths as low as 120 electrical degrees can be utilized without substantially sacrificing motor performance and efficiency. In preferred embodiments that have been constructed and tested however, the arc length of the magnets have been between 135 and 160 electrical degrees.

The curves of FIG. 11 are ideal representations of torque per ampere. They depart from the ideal when winding inductance, rotor speed and advance timing angle are taken into account. Inductance slows the rate of current rise, so that the L/R time constant of the windings becomes an increasingly important factor as higher rated speeds are selected. As a general rule, the advance timing angle is greater for higher speeds, but optimum performance is achieved when winding turn off or commutation occurs nearly on a flat portion of the torque curves of FIGS. 11A–C, and turn on occurs on a rising portion of these same torque curves.

FIGS. 12-15 are similar to FIGS. 11A-C at least to the extent that the former are idealized plots of the ratio T/I (torque per ampere) for a motor such as the one of FIG. 1 as a function of rotor position for different amounts or extents of stator winding spread. In FIGS. 12-15, the solid trapezoidal curves show instantaneous torque per ampere that would result if one winding (e.g., winding 22a) were left "on" for a full revolution of a rotor. The dashed trapezoidal curves are similarly drawn for another winding (e.g., winding 22b). The data for curves 12-15 are based on an assumption that a single two pole rotor having magnet arcs of 135 electrical degrees is used with stators having different winding spans or concentrations. The curves of FIGS. 12-15 would result, respectively, with winding set side turn spreads of 90, 60, 120, and 30 electrical degrees, respectively. The duration or extent, in electrical degrees, of the flat portions of the curves in FIGS. 12–15 have been denoted in the drawing figures. It will be noted that the duration of such flat portions decrease with increasing coil side turn spreads. Stated conversely increasing coil side turn concentrations cause increased flat portion, (maximum T/I) duration.

The curves of FIGS. 12–15 are based on winding distributions that are assumed to provide an equal number of turn segments per slot. As will be appreciated from FIGS. 1 and 2, windings 22 include end turn portions disposed along the end faces of the stator core, and side turn portions that are disposed along the axially extending stator core slots.

Taking winding 22b as exemplary, and referring to FIG. 2, winding b is formed of two sections or coil groups. Each of these groups has three concentric coils, with each coil comprised of a plurality of turns and with side turn portions of such coils in a stator slot. The span of the outermost coil of each coil group determines the span of each coil group. However, the "spread" or "concentration" of winding 22b is determined by the collective arcuate span of one half of the side turn portions of both coil groups.

Thus, all of the conductors of winding 22b that carry current into the plane of FIG. 2 (or out of the plane of the drawing) collectively establish a "spread" of ninety electrical degrees. If the winding 22b consisted of two coil groups each having only one coil and these coils shared the same slot, then "concentration" or minimum "spread" would be achieved.

It will be understood from a comparison of FIGS. 11A–C and 12–15 that maximum values of T/I will be of longer duration if the winding "spread" is minimized and the rotor magnet arc length is maximized.

When maximum torque over a full rotor revolution is desired, the waveforms of FIGS. 11A–C and 12–15 should be kept "flat" as long as possible. However, if the duration of maximum T/I were a theoretical maximum of 180 electrical degrees, a square wave would result. In other words, the leading part of the waveform would become infinitely steep. However, with steeper waveforms, there is more possibility of starting problems. Therefore, I prefer that the leading part of the waveform be as steep as possible without causing objectionable starting problems. In this connection it should also be noted that running requirements may require more winding turns, and therefore a greater winding "spread". This in turn results in a less "steep" waveform, which in turn would cause a need for a greater advancement of commutation for optimized running efficiency.

Figure 19:
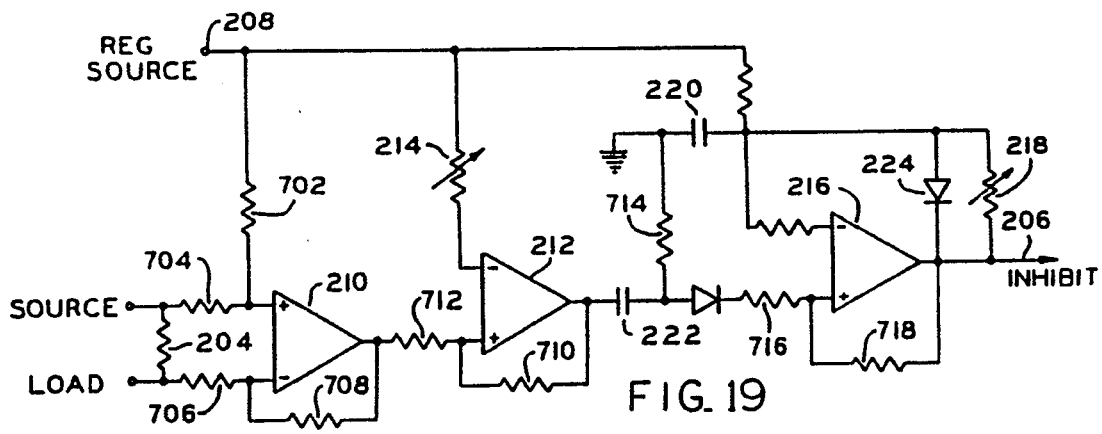
FIG. 19 is a schematic diagram of a circuit for sensing stator winding current and for interrupting that current for a short predetermined time interval when the sensed current exceeds a prescribed value.

While NOR gates have been employed in FIG. 6, a wide variety of combinations of AND, OR, NAND, and NOR gates may be used to accomplish the desired logical combinations. As a further variation on the circuit of FIG. 6, provision may be made for sensing the current in one or more stator windings and for limiting the current supplied to the stator windings when the sensed current exceeds a prescribed value. FIG. 19 illustrates an inhibiting circuit which will sense stator current and interrupt that current for a short predetermined time interval each time that the sensed current exceeds a prescribed value. The circuit of FIG. 19 is operative primarily during motor start-up and the predetermined time interval is less than the time interval during which a specified stator winding is enabled. The inhibit feature of FIG. 19 may be incorporated into the system depicted in FIG. 6, for example, by inserting the relatively small resistance 204 in series between the voltage source and the several stator windings, for example, by placing it in the upper right-hand line of FIG. 6 which connect to the plus V source. To adapt the logic circuitry of FIG. 6 for an inhibit function, the several gates 80 may be three input NOR gates with that additional input (not illustrated in FIG. 6) for each gate connected together and to the inhibit output line 206 of FIG. 19. Clearly, numerous other implementations of the inhibit function are possible.

In FIG. 19, the resistance 204 will be in series with a stator winding and the circuitry of FIG. 19 will respond to the voltage across resistance 204 to disable the stator winding for a short time interval when that resistance voltage exceeds a predetermined value. For comparison purposes, a regulated, for example, ten volt, direct current source, is applied to terminal 208 which while, not shown, may comprise a conventional center tapped transformer or bridge rectifier zener regulated direct current source. The inhibit signal is, for example, of 300 microsecond duration after which the NOR gate of FIG. 6 or other transistor circuitry will be allowed to reenergize the particular winding.

In FIG. 19, an operational amplifier 210 amplifies the voltage sensed across resistor 204 and supplies that amplified voltage to one input of amplifier 212. Amplifier 212 is connected as a comparator and receives as its other input a reference voltage as scaled by the setting of potentiometer 214. The output of amplifier 212 is differentiated and employed to enable amplifier 216. The amplifier 216 is connected as a "one shot" and remains on for a time duration determined by the time constant of the potentiometer 218 and capacitor 220. The one slot amplifier 216 provides a high signal on line 206 for the exemplary 300 microsecond time period to disable the motor winding when, for example, the instantaneous winding current exceeds 10 amperes.

The three illustrated amplifiers in FIG. 19 are integrated circuit operational amplifiers, for example, type MC3301B. The capacitor 222 between the output of amplifier 212 and the input of amplifier 216 performs the differentiation function. The output of amplifier 216 goes high to inhibit the winding which level charges capacitor 220 by way of the variable resistor 218 and when the charge on capacitor 220 becomes sufficiently large, the difference between the two input signals to amplifier 216 is low enough to force the amplifier output back to its low level and capacitor 220 discharges by way of diode 224.

Figure 20:
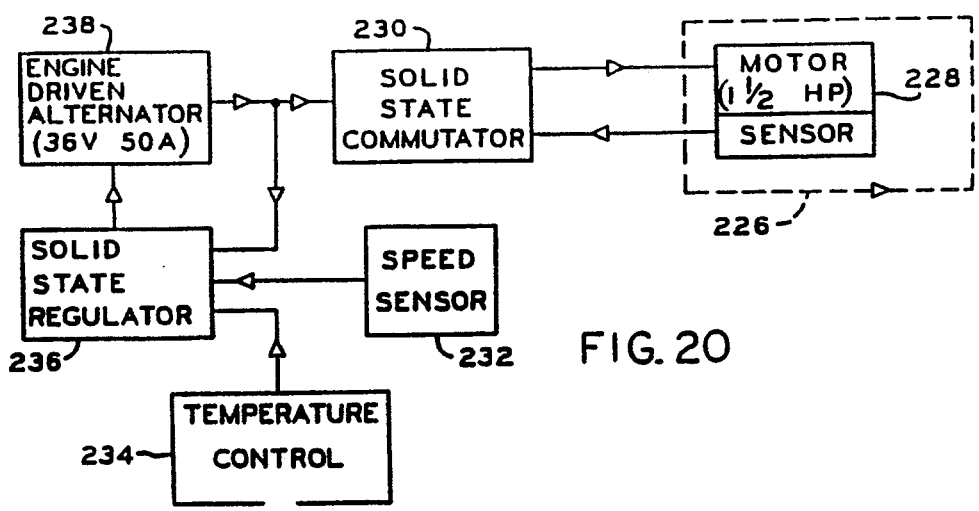
FIG. 20 is a block diagram of a vehicular air conditioner system, hermetically sealed and employing one embodiment of the present invention.

The block diagram of FIG. 20 illustrates one hermetic environment in which the brushless D.C. motor of the present invention finds particular utility. A hermetically sealed refrigeration system 226 includes a conventional compressor (not illustrated) driven by the brushless D.C. motor 228 which may, for example, be of the type illustrated in FIG. 1. The motor 228 receives armature energizing current from the solid state commutating circuit 230 and provides thereto position signals, for example, from the optical position indicators discussed earlier. A speed sensing circuit 232 as wall as a temperature control, such as a conventional thermostat 234 provides an input signal to a solid state field current regulating circuit 236. The field current regulating circuit 236 controls the vehicle engine-driven generator or alternator 238 which in turn supplies energy to the motor 228 by way of the commutating circuit 230. By controlling the field current to the alternator or generator 238, the power supplied to the motor is readily controlled to in turn control the resulting temperature from the air conditioning system. The system outlined in FIG. 20, eliminates the more conventional belt-driven compressor arrangement typically found in vehicle air-conditioning systems and provides instead a system which may be adapted to either energization from the alternator 238 or when the vehicle is parked from a standard alternating current outlet. The commutating circuit 230 may be of the same general configuration as the circuit of FIG. 6 in the event that optional operation from a standard alternating current outlet or use of an alternator rather than a D.C. generator is desired, suitable bridge or other rectifying circuitry would be incorporated in the FIG. 6 circuit or in the alternate solid state commutator circuits 230 as illustrated in FIG. 21 with the corresponding speed sensing circuit 232 illustrated in FIG. 22.

Figure 21:
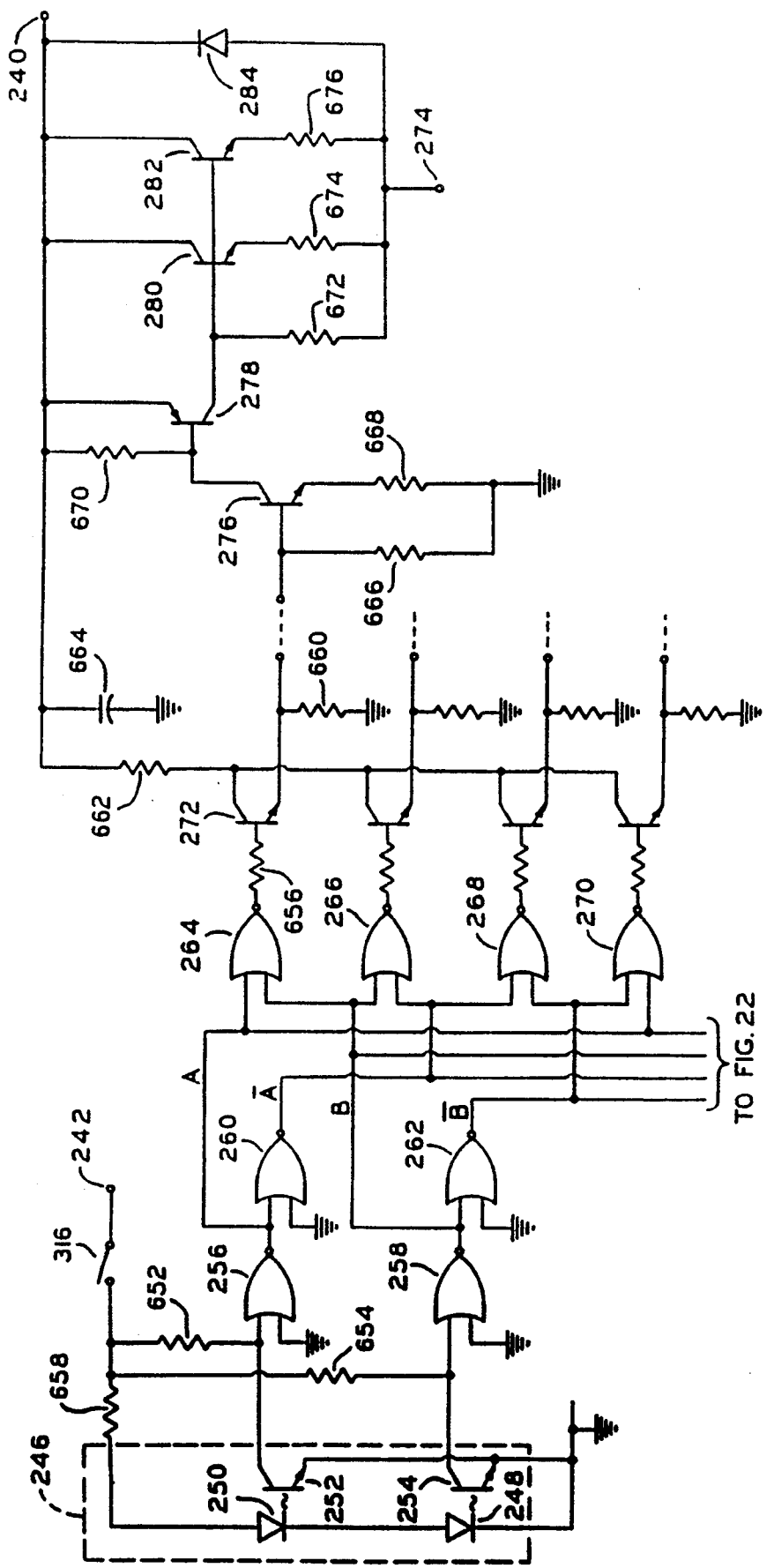
FIG. 21 is a schematic diagram of the solid state commutator circuit of FIG. 20.
Figure 22:
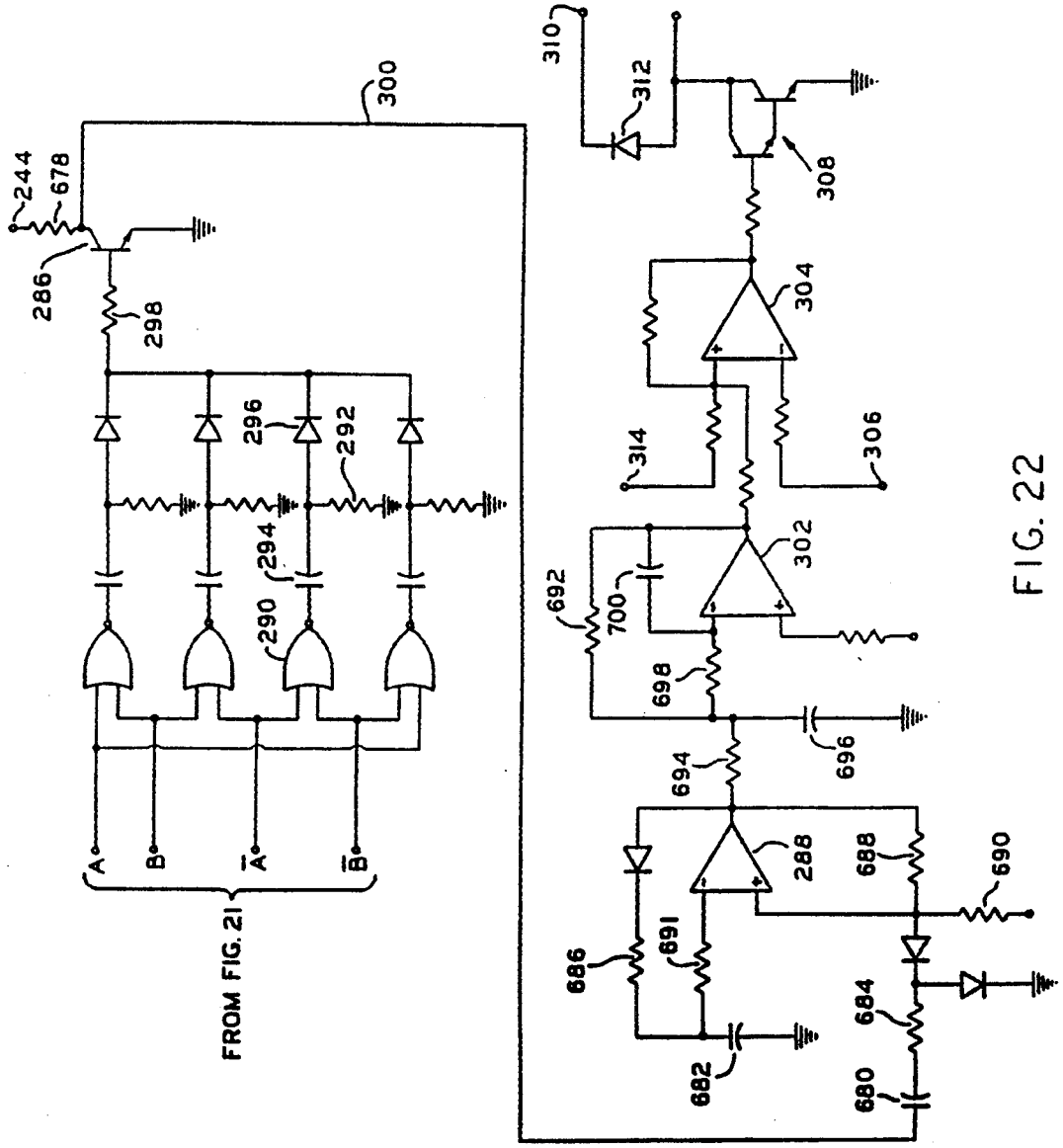
FIG. 22 is a schematic diagram of the speed sensor of FIG. 20.

In the specific implementation illustrated in FIGS. 21 and 22 the voltage output from the engine driven alternator 238 is applied to terminal 240 while the twelve volt direct current vehicle battery source is applied at terminal 242 and a zener regulated battery voltage of twelve volts is applied at terminal 244. In FIG. 21, position sensors 246 operate much as before in conjunction with a shaft mounted light shutter so that the respective light emitting diodes 248 and 250 will cause either one or both of the light sensitive transistors 252 and 254 to be conducting. The conducting or non-conducting indications or signals are inverted by NOR gates 256 and 258 which in conjunction with NOR gates 260 and 262 may be a type CD-4001 integrated circuit and function as a primary decoder to form the A, B, not A and not B signals as before. These signals are supplied to the corresponding inputs in FIG. 22 as indicated and further are logically combined by NOR gates 264, 266, 268, and 270 in the manner already described in conjunction with FIG. 6 to provide the four winding enabling signals, only one of which occurs over every ninety degrees of shaft rotation. As before, the four sequential winding energizing signals are then applied to four corresponding transistors such as 272 for amplification to in turn be supplied to four winding enabling power modules, only one of which is illustrated in FIG. 21. Each power module is connected to one of the four illustrated transistor emitters, and to the alternator source at 240 and to supply that alternator voltage to its respective motor winding at terminal 274. Conventional alternator output rectification may be employed but is not illustrated in FIG. 21.

Transistors 270, 276 and 278 function as amplifiers to provide sufficient base drive current to a pair of parallel connected type 2N6258 power transistors 280 and 282. Diode 284 is, as before, a discharge path for the inductive energy which is present in a winding when that winding is abruptly turned off. In operation, when the output of one of the four NOR gates such as 264 goes high, transistor 272 is enabled to conduct in turn enabling transistors 276 and 278 to their conducting state to supply a base drive current to the pair of parallel transistors 280 and 282, the conduction of which supplies the direct current voltage at terminal 242 to one terminal 274 of a motor winding the other terminal of which would typically be grounded.

Figure 8:
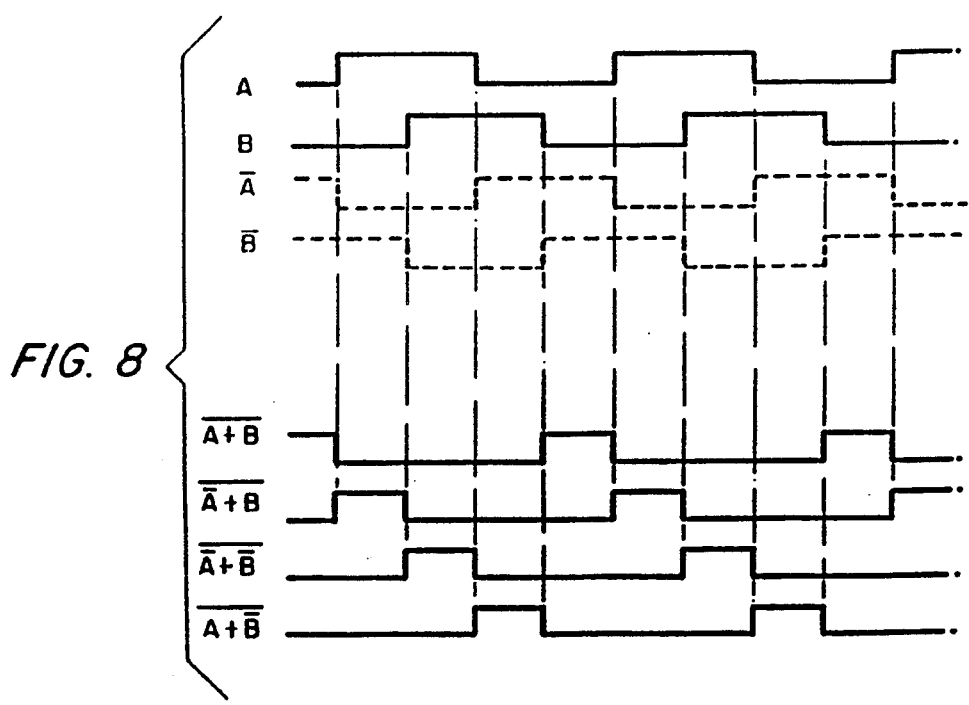
FIG. 8 illustrates the relative relationship between the angular position of the rotor and the outputs of the two light sensitive elements, A and B, and the switching pulses produced as a result of rotor rotation.

The A and B signals, as well as their complements are also supplied as inputs to the speed sensing circuitry of FIG. 22 and are logically combined by four NOR gates again of a type CD-4001 in a manner such that exactly one of those NOR gate outputs is high at any given instant and each remains high for ninety degrees of shaft rotation thereafter going low and the next NOR gate output going high. These NOR gate outputs are of a rectangular wave form and are differentiated and applied to a transistor 286 for amplification and the resulting sequence of short voltage pulses provided as inputs to an integrated circuit amplifier 288. For example, during the time interval that both the A and B signals are high, NOR gate 290 will just as illustrated in FIG. 8 provide a high output pulse and an exponentially decaying spike of voltage will appear across transistor 292 due to the initial short circuit and subsequent blocking effect of the charge accumulating on capacitor 294. This spike is delivered by way of diodes 296 and resistor 298 to the base of transistor 286 and that transistor will conduct for a short interval to effectively ground the line 300. The periodic grounding of line 300 occurs at the beginning of each rectangular pulse from the gate 290 since the beginning of a pulse provides a positive going spike while the termination of that pulse provides a negative going spike which is prevented from passing to the base of the transistor 286 by diode 296. This periodic grounding of line 300 triggers amplifier 288 which is an operational amplifier in a "one shot" configuration, the output of which is a sequence of square waves of uniform height and duration. This square wave train is supplied to a second amplifier 302 which functions as a filter and provides as an output the speed signal to be supplied to yet another amplifier 304 which is again an operational amplifier, this time connected as a comparator. The output amplifier 302 is compared to the generator voltage as applied to terminal 306 and the amplifier 304 output is either high or low, depending upon whether the speed indicative signal exceeds or is less than the voltage applied to terminal 306. If the signal exceeds the alternator output voltage, the output of amplifier 304 is high, turning on the Darlington configured transistor pair 308, coupling the one alternator field terminal to ground, thereby increasing the voltage output of the alternator. Alternator field terminal 310 is coupled to a battery voltage source and a diode 312 is connected across the alternator field terminals and that diode, in conjunction with the inductance of the alternator field, functions to smooth out the otherwise pulsed field current due to the turning on and the turning off of transistor pair 308. The width of a single pulse output from the one shot amplifier 288 is constant whereas the frequency of occurrence of those pulses is directly proportional to the frequency of grounding the line 300 which in turn is indicative of rotor speed. Thus, when the rotor speed increases more such pulses are provided to the filter 302 during a given time interval and the output signal (the average of the voltage input level) from that filter is of a higher level. This higher voltage supplied to the positive input of amplifier 304 causes that amplifier output to go high (presuming the alternator output voltage has not changed) to thus cause transistor pair 308 to conduct and to increase the alternator voltage output. A voltage such as the vehicle battery voltage is also applied to terminal 314 to assure some alternator voltage when the motor is at a standstill. Thermostatic control may be implemented as a simple single switch 316 of FIG. 21 or more sophisticated control techniques may be employed, for example, by changing the threshold voltage of comparator 304 or other techniques such as discussed in conjunction with FIG. 24.

Figure 23:
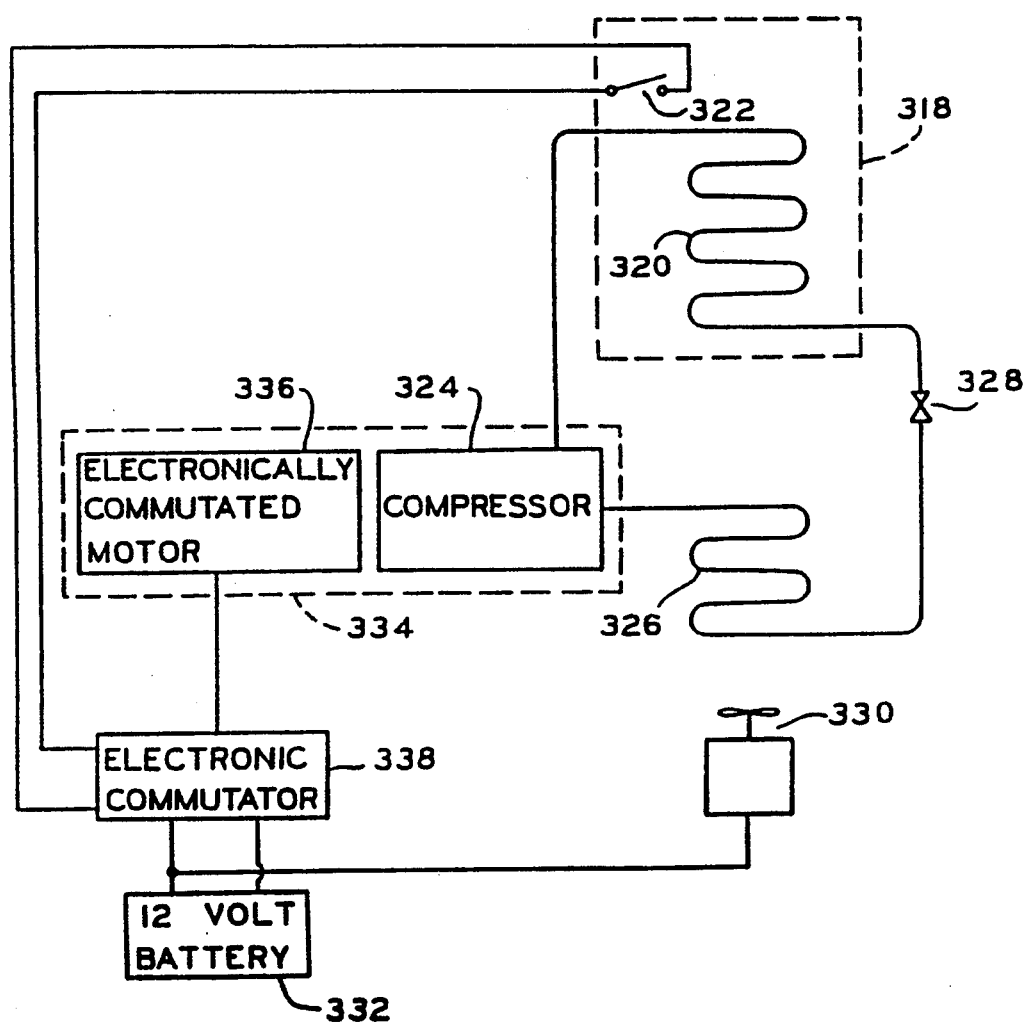
FIG. 23 is a block diagram of another hermetic environment illustrating use of the invention in one form thereof.

Another exemplary hermetic environment in which the present novel brushless direct current motor finds particular utility is illustrated in FIG. 23 where a conventional refrigerator enclosure 318 contains an evaporator coil 320 and a pair of thermostatically controlled contacts 322 which close to actuate the refrigeration system when the enclosure temperature exceeds some preferred value. A compressor 324 pumps refrigerant to a condensor coil 326 where excess heat is extracted and the refrigerant then moves on to an expansion valve or capillary 328 and into the evaporator coil 320. The refrigerant circuit and the cooling of the condensor coil 326 by a fan 330 are conventional; however, the block diagram of FIG. 23 is unique in that the system is deployed in a portable or mobile environment and is powered, for example, from a vehicle twelve volt battery 332 and has a hermetic enclosure 334 enclosing the compressor 324 and motor 336 rather than employ the conventional engine driven compressor arrangement typically found in vehicle environments. The electronic commutator 338 may be of the type illustrated in FIG. 6 or FIG. 21 and a thermostatic control thereof may be implemented as before or as illustrated in FIG. 24.

Figure 24:
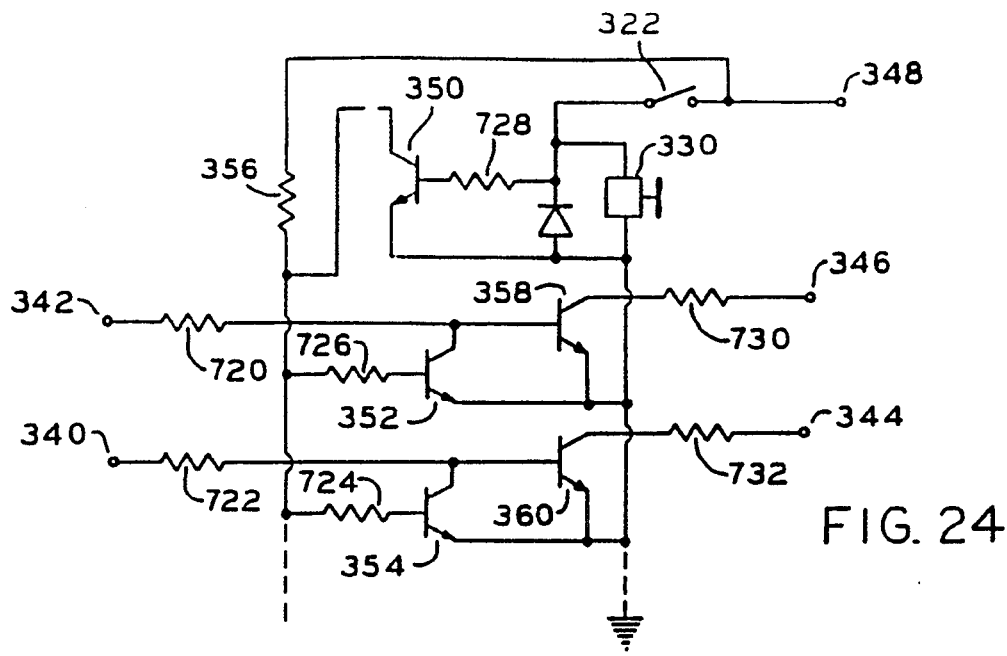
FIG. 24 illustrates in schematic a portion of a circuit which may be interposed between the output of the NOR gates 80 and the base of transistors 82 in FIG. 6 to facilitate implementation of the FIG. 23 refrigeration system.

In FIG. 24, NOR gates such as 80 of FIG. 6 are connected to four substantially identical input terminals, such as 340 and 342 while the output terminals of FIG. 24 would be coupled to the bases of four transistors 82 in FIG. 6. The exemplary twelve volt direct current source would be coupled to terminal 348 and the contacts of the thermostat 322, function to connect this positive voltage source to the condensor coil fan 330 and to the base of transistor 350. So long as the switch 322 is open, the transistor 350 is maintained in its non-conducting state and transistors such as 352 and 354 receive base drive by way of resistor 356. Conduction by transistors 352 and 354 prevents conduction by transistors 358 and 360, respectively, thereby precluding any winding enabling signals at terminals 344 and 346 (no path for base current in transistor 82) When switch 322 is closed, the transistor 350 is rendered conductive to effectively ground the source of base current for the transistors 352 and 354 forcing those transistors to go to their non-conductive state and allowing the appropriate transistor 358, 360, or other transistor similarly positioned for the other windings, to become conductive when energized by their respective terminals such as 340 and 342 allowing the commutator circuit to function as previously described.

Figure 16:
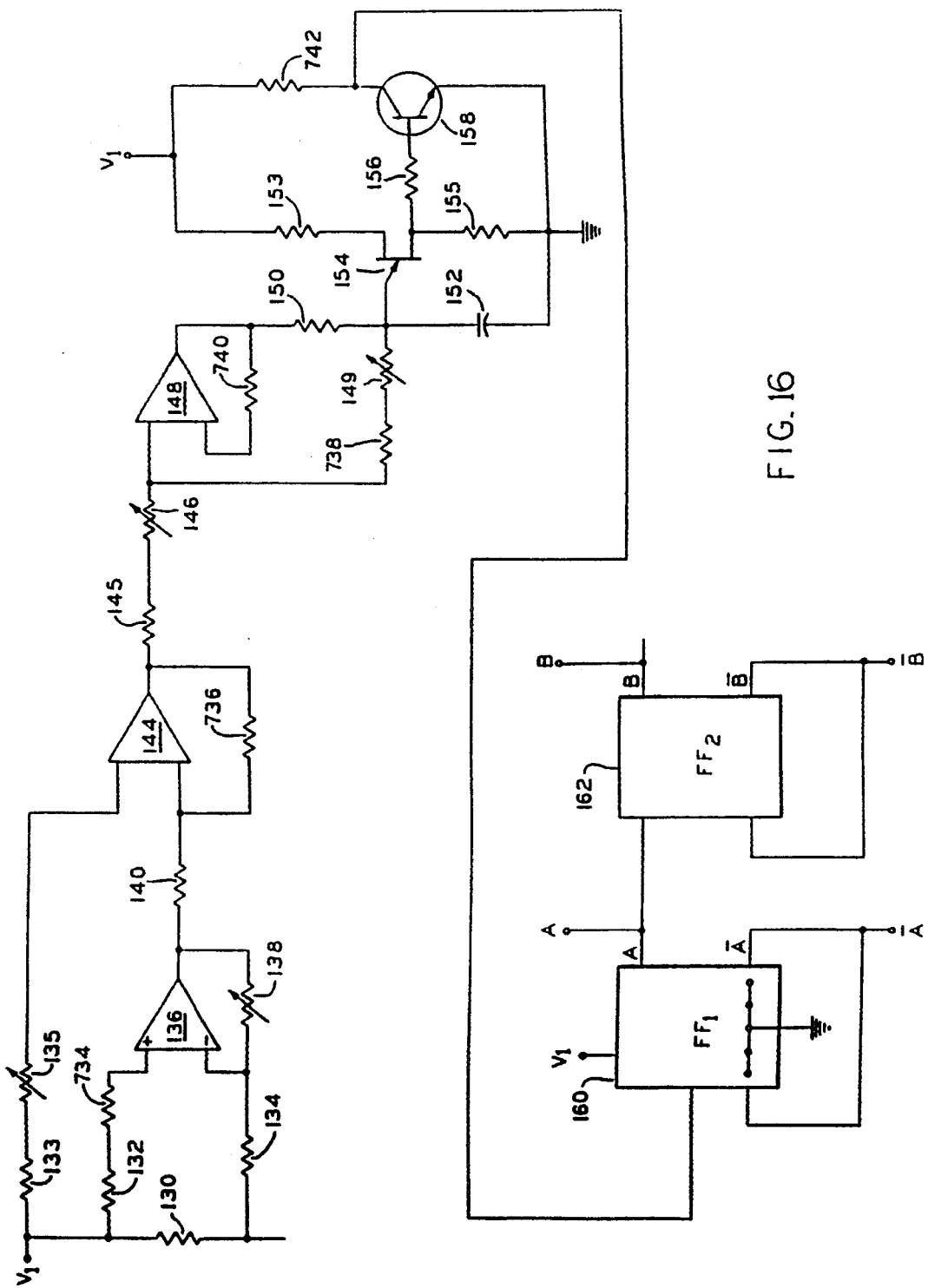
FIG. 16 illustrates in schematic form a circuit for supplying the A and B signals and their complements to circuitry such as illustrated in FIG. 6 without the need for special mechanical type devices to sense the angular position of the motor rotor.

The circuit of FIG. 16 illustrates one manner of omitting electrooptical or electromechanical rotor position sensing devices and is particularly suited to the situation where the several motor windings are connected in a star or a wye connection. The circuit of FIG. 16 has the resistance 130 connected between the source of voltage for the windings and the several windings. For example, resistance 30 might be coupled between the upper right hand terminal of FIG. 6 which is marked +V and the voltage source. Similarly, the resistance 130 might couple the common connection of the star connected winding to ground. In either event the total winding current flowing through resistor 130 develops a voltage thereacross which is applied to the plus and minus terminals of an operational amplifier 136 through resistive elements 132 and 134, respectively. As shown more fully in FIG. 6, the stator windings 22a, 22b, 22c and 22d are connected in a star configuration to ground and the resistor 130 may be connected between the center of the star and ground. A variable bypass resistor 138 is disposed about the operational amplifier 136. In turn, the output of the operational amplifier 136 is applied through a resistor 140 to one input of an operational amplifier 144, whereas the supply voltage $V_1$ is applied through a fixed resistor 133 and a variable resistor 135 to the other terminal of the operational amplifier 144. As a result, the operational amplifier 136 senses the voltage drop imposed across the resistor 130, thereby sensing the total motor current to provide an output proportional to the current I in the stator windings and also to the voltage lost in the motor due to its winding resistance R. This voltage drop may be characterized as the IR drop of the motor. The operational amplifier 148 determines the difference between the supply voltage $V_1$ and the output of the operational amplifier 144 to provide an output indicative of the motor's back EMF (V-IR), which is an indication of the speed of the brushless DC motor.

The output of the operational amplifier 144 is applied through a fixed resistor 145 and a variable resistor 146 to a voltage-controlled oscillator formed essentially of an operational amplifier 148, a unijunction transistor 154 and a transistor 158. The output of the voltage-controlled oscillator is derived from the collector of the transistor 158 and is of a frequency proportional to the voltage input and therefore the speed of the brushless DC motor. In particular, the operational amplifier 148 acts as a current source for charging the capacitor 152 through the resistance 150. The capacitor 152 charges until the threshold level of the unijunction transistor 154 is reached, at which time the unijunction transistor 154 is rendered conductive in a forward direction, whereby the voltage stored upon the capacitor 152 discharges through the unijunction transistor 154 and a resistor 155. As shown in FIG. 16, the threshold voltage of the unijunction transistor 154 is set by the values of the resistors 153 and 155, which form in effect a voltage dividing circuit upon which is impressed a supply voltage $V_1$. As the discharge occurs through the resistor 155 the voltage developed thereacross and applied through resistor 156 to the base of transistor 158 rises until the transistor 158 is rendered conductive, therby dropping the output taken from its collector toward ground potential. Thus, it can be seen that the output as derived from the collector of the transistor 158 is essentially a square-waveform, varying at a frequency dependent upon the charging current to capacitor 152 and therefore the speed of the brushless DC motor.

Figure 17:
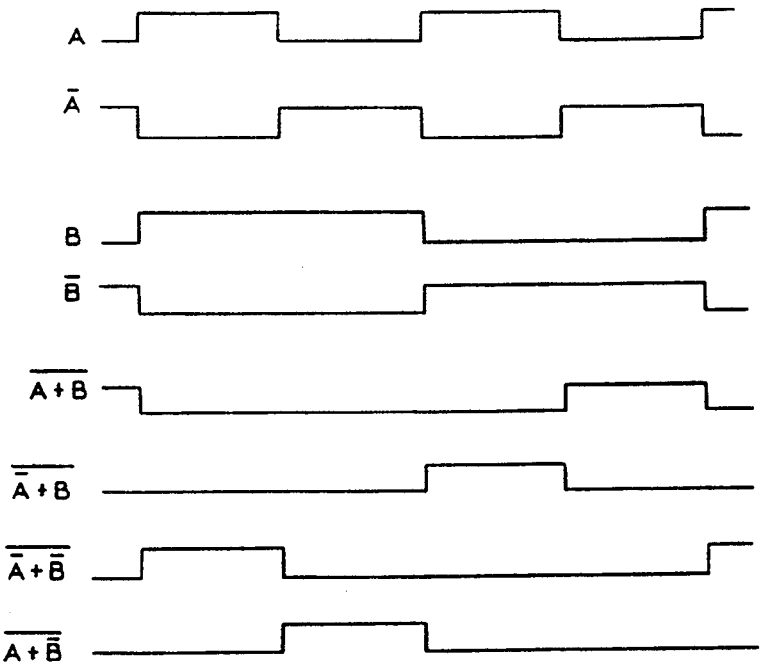
FIG. 17 illustrates the four output signals obtained from the circuit of FIG. 16 and their combination according to the logic circuitry illustrated in FIG. 6.

The output of the voltage-controlled oscillator is applied to a first flip-flop 160 whose outputs A and $\overline{A}$ are complementary square waves as illustrated in FIG. 17. In particular, the input signal of a frequency corresponding to the speed of rotor rotation is applied to the input of the flip-flop 160, which divides the frequency of the input signal by two to provide a train of squarewave pulses. Further, the flip-flop 160 provides the complement signal $\overline{A}$ also shown in FIG. 17. The A output of the flip-flop 160 is applied to the input of second flip-flop 162 which also divides the frequency of the input by two to provide an output signal B and its complement $\overline{B}$ as shown in FIG. 17. The resulting squarewave signals A, B, $\overline{A}$ and $\overline{B}$ indicate the speed of rotation of the motor and further simulate the angular position of the rotor shaft as it makes a complete revolution. More specifically, these signals are considered to simulate the rotor position in that as the rotor begins to rotate, it seeks its own position with respect to the energizing signals applied to the stator winding 22a, 22b, 22c and 22d. Though these aforementioned signals as derived from the flip-flops 160 and 162 do not precisely identify the rotor position in the same sense that the outputs of the sensor as described in the discussion of FIG. 8, these outputs occur sequentially during the rotation and effectively simulate the position of the rotor once the rotor has locked into the stator field.

It should also be noted in comparing FIGS. 8 and 17 that in the sensorless embodiment of FIGS. 16 and 17 the windings are no longer energized in alphabetical order. The simple expedient of physically interchanging a pair (such as a and d) of the winding connections at the output of the transistors 83 will correct this situation and give the proper alphabetical sequence of energization Similarly the timing diagram of FIG. 17 has assumed the flip-flops 160 and 161 to be of a type wherein the leading edge of the A output of flip-flop 160 triggers the output of flip-flop 162 so that its B level is high or a 1. If flip-flop circuitry which triggers on a trailing edge of the A waveform is employed, the motor will run in a direction opposite that in which it runs when employing leading edge triggering flip-flops if the other connections are unchanged. Again, it should be remembered that the output of the flip-flops 160 and 162 may be processed and applied to the windings in the same manner as the A and B signals and their complements as illustrated in FIG. 6.

The start-up operation of an electronic commutating circuit disclosed herein will be explained with respect to FIGS. 16 and 17. Initially, the circuits are turned on by applying the supply voltage $V_1$ thereto. Initially, the rotor of the brushless DC motor is standing still; under this condition, the output of the voltage-controlled oscillator is set to generate an output of a frequency which, for example, corresponds to a rotor speed of approximately 60 rpm, such that as each of the stator windings 22a, 22b, 22c and 22d is sequentially energized, at least one the stator windings will produce a positive torque upon the rotor, thereby initiating its rotation. As rotation occurs, the rotor of the brushless DC motor will lock into the field of the stator. The voltage-to-frequency oscillator is programmed in that the initial output is not set to zero, but at a selected frequency. e.g., corresponding to a rotor shaft of 60 rpm ensuring that the motor is self-starting. The frequency of the output of the voltage-controlled oscillator will remain low until the rotor 10 has locked into the field of the stator windings. With regard to FIG. 16, the initial frequency of the output of the voltage-controlled oscillator is determined by setting the variable resistor 149 to a value such that the rotor 10 will lock into the stator field. Thereafter, the speed of the rotor will increase until its running speed is obtained. The rate of frequency increase for a voltage input is determined by setting the variable resistor 135. Thus, the voltage-controlled oscillator is considered programmed in the sense that initially, the output is set to a frequency to ensure that the rotor will lock into the stator field and thereafter, that the speed of the rotor is brought up at a selected rate.

Not only are shaft position sensors eliminated by the embodiment illustrated in FIGS. 16 and 17, but further, since this embodiment operates basically on a square wave not illustrated in FIG. 17 but clearly having a repetition rate twice that of, for example, waveform A, square wave energization of a brushless or commutatorless direct current motor may take other forms. The square wave signal output from transistor 158 in FIG. 16 has a frequency proportional to rotor speed and in that particular embodiment for a two pole machine that frequency turns out to be double the rotor speed. Digital or computer control of a direct current motor now becomes feasible and the square wave employed according to the principals set forth in the discussion of the embodiment of FIGS. 16 and 17 may take other forms.

Figure 18:
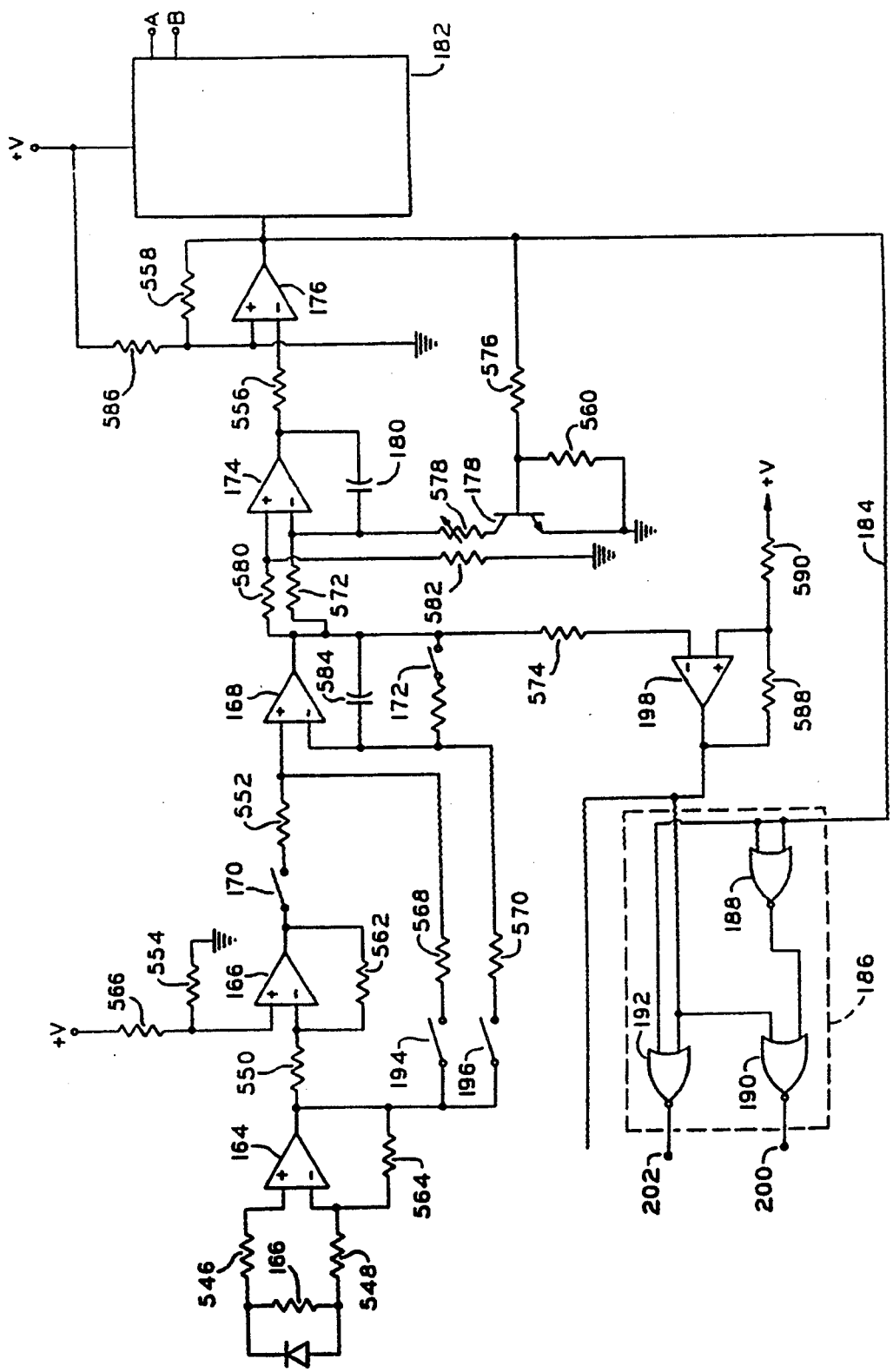
FIG. 18 is a schematic diagram of a motor control circuit analogous to that illustrated in FIG. 16 but selectively employing a control signal which is proportional to motor load.

FIG. 18 illustrates one such unique and useful variation wherein during startup of the motor a signal proportional to motor speed is employed whereas during normal running operation of the motor a signal portional to the motor load is employed.

In FIG. 18 signals which simulate the signals normally obtained earlier from shaft positioned sensors are obtained from a dual output flip-flop that is triggered by a voltage controlled oscillator. Voltage control for this oscillator is derived from a signal that during startup is proportional to motor speed and that during running is proportional to the motor load. The flip-flop outputs are fed by way of inverters and also directly into signal conditioning circuits such as 80 of FIG. 6. Motor speed is adjusted according to load based on the need for the current flowing in any given winding of the motor to have an essentially square waveform. Thus, the front and back halves of the waveform are individually sampled, integrated and compared. If they differ from each other, voltage to the voltage controlled oscillator is changed depending upon this comparison between the leading and trailing half of the waveform and motor speed is accordingly slowed or increased.

In FIG. 18 an amplifier 164 senses the voltage drop across resistor 166 which like resistor 130 in FIG. 16 carries total motor current. In practice, such resistors would be quite small and may, for example, be of the order of a few hundredths of an ohm. The output of amplifier 164 is proportional to the current in the motor and also proportional to the voltage lost to the motor due to its winding resistance. This amplifier output then is representative of the IR drop of the motor. A similar operational amplifier 166 receives the signal representative of the motor IR drop as one input and the applied voltage as the other input. As before then, the output of amplifier 166 is proportional to the term V-IR which output is an indication of the speed of the permanent magnet DC motor. This speed indicative signal provides one input to amplifier 168 so long as switch 170 is closed. The switch 170 is closed during startup and until approximately two-thirds of the full load motor speed is obtained, at which time switch 170 is opened and the speed signal has no further effect on the performance of the system.

Switch 172 is ganged to close when switch 170 is closed and open when switch 170 is open. When these two switches are closed amplifier 168 performs as an operational amplifier with output proportional to speed. When these two switches are open amplifier 168 performs as a differential integrator with an output proportional to the load existing at that particular moment. The output of amplifier 168 is supplied to a voltage-controlled oscillator which oscillator includes amplifiers 174 and 176 along with the feedback circuits including transistor 178 and capacitor 180 and their related resistances. The output of the voltage-controlled oscillator from amplifier 176 is a square wave with frequency proportional to the voltage supplied as the output of amplifier 168. The output of the voltage-controlled oscillator is supplied to a flip-flop circuit 182 which is a type CD 4013 AE and provides A and B output square waves with the waveforms being substantially identical to the A and B waveforms illustrated in FIG. 17. A pair of sample NOR gates or invertors may be employed to obtain not A and not B waveforms and these four waveforms supplied as before to the A, B, not A and not B lines of FIG. 6. The frequency of the A waveform is one-half that of the voltage-controlled oscillator while the B waveform has a frequency one-fourth that of the voltage-controlled oscillator.

The voltage-controlled oscillator output is also supplied by way of line 184 to a logic chip 186, for example, a CD 4001 AE which includes three = NOR gates 188, 190, and 192.

Switches 170 and 172 are logic gates which are closed so long as the output from amplifier 198 is low indicating a relatively low motor speed and which open when the output from amplifier 198 raises indicating, for example, the motor is up to two-thirds of its running speed. The output from amplifier 198 is also supplied to logic chip 186 which, due to the presence of the inverting NOR gate 188 alternately closes switches 194 and 196 by way of control signals on lines 200 and 202 to alternately sample the front and back half of the current waveform signal as seen at the output of amplifier 164. The front and back half signals are supplied as the negative and positive inputs to amplifier 168 respectively which, as noted earlier, functions as a differential integrator with a long time constant and the output of amplifier 168 will increase when the trailing edge (switch 194 closed) is greater than the leading edge of the waveform while with switch 196 closed if the leading edge of the waveform is greater than the trailing edge the output of amplifier 168 will decrease. Similarly, if the waveform output from amplifier 164 is approximately the desired square waveform the output of amplifier 168 will remain constant.

Further variations on the present invention should now be understood without too much difficulty. The schematic diagram of FIGS. 25a and 25b and the associated wave forms as depicted in FIG. 26 illustrate another approach to an electronically commutated direct current motor which does not employ rotor position sensors as such, but rather senses the back emf of the winding next to be enabled in the winding energizing sequence. This circuitry is employed in conjunction with a two phase two pole motor with bifilar windings for each phase which motor lacks the position sensors but is otherwise quite similar to the motor depicted in FIG. 1. Current from a battery or other direct current source is coupled from the plus V terminal to the individual motor windings by transistors such as 362 and 364 which are connected in a modified Darlington configuration with one such pair for each motor lead. Some grounding problems in the logic circuitry may be avoided in, for example, a vehicle battery powered refrigeration system if the plus V terminal is connected to the positive battery terminal and sequentially to each positive motor winding lead with all the negative motor winding leads connected together and to the negative side of the source. Feed back diodes such as 366 as before provide a current path in one winding for energy stored in another winding at the time the current in that other winding is switched off. The capacitor 368 as before functions as a sink for this energy, for example, when the source is inadvertently opened or when the source is other than a battery. Each winding and transistor pair are enabled one fourth of the time and diode 370 may be included to provide against inadvertent reverse polarity connections since current flow through that diode due to a reverse polarity situation will cause failure of the fuse 372. The direct current source plus V in addition to being coupled sequentially to the motor windings is applied to terminal 374 as an energy source for the output driver transistor such as 376 and to terminal 378 where it is processed by the zener diode filter network to provide at terminal 380 a regulated voltage $V_r$ of, for example, 8.2 volts for use as a voltage source to the logic packages and operational amplifiers.

The logic circuit in general functions to sequentially drive the power transistors such as 362 and 364 and to initiate the drive signal when the rotor mounted permanent magnets of the motor are optimally located with respect to the winding to be turned on. This optimal location is derived from the back emf voltage of the winding next in the drive sequence. Operational amplifier 382 functions to integrate this back emf voltage and when this integrated voltage reaches a reference level, the succeeding logic parts are made to change state and to sequence or index to the next winding energizing event. In the process, the drive signal to the on transistor from drive transistors such as 376 is removed and redirected to the next Darlington pair or output transistor to be energized. The motor leads 3a4, 386, 388 and 390 at the extreme right of the drawing are connected to like numbered terminals at the left-hand of the drawing for this back emf sensing function and are sequentially sampled by the switches 392, 394, 396 and 398 which are in turn sequentially enabled by outputs from NOR gates such as 400 by way of the interconnected terminals 402, 404, 406 and 408. An over or under voltage detecting function is provided by circuitry having the operational amplifiers 410 and 412 as its nucleus and an underspeed detector circuit is structured about the four operational amplifiers 414, 416, 418 and 420. These last two detector circuits, in the event of a fault, cause transistor 422 to go nonconducting thereby preventing any enabling current flow in the output driver transistors such as 376 and hence no winding energizing current through the output transistors such as 362 and 364.

Inverting amplifiers 442 and 444 are coupled together with feedback to form a Schmitt trigger circuit while NAND gates 446 and 448 are connected together to form a one shot multivibrator. The output of the one shot multivibrator passes through an inverting NAND gate 450 and into a pair of flip-flops 452 and 454 to provide the Q1 and Q2 signals along with their complements to be logically combined by a first decoder comprising four NAND gates such as 456 and a second decoder comprising four NOR gates such as 400. The NAND gates may be of a CD4011 type while the NOR gates may be of a CD4001 type. The concatenated invertors 416 and 418 which form the Schmitt trigger circuit may similarly be type CD4001 while invertors such as 458 may be a type CD4049.

Figure 25A:
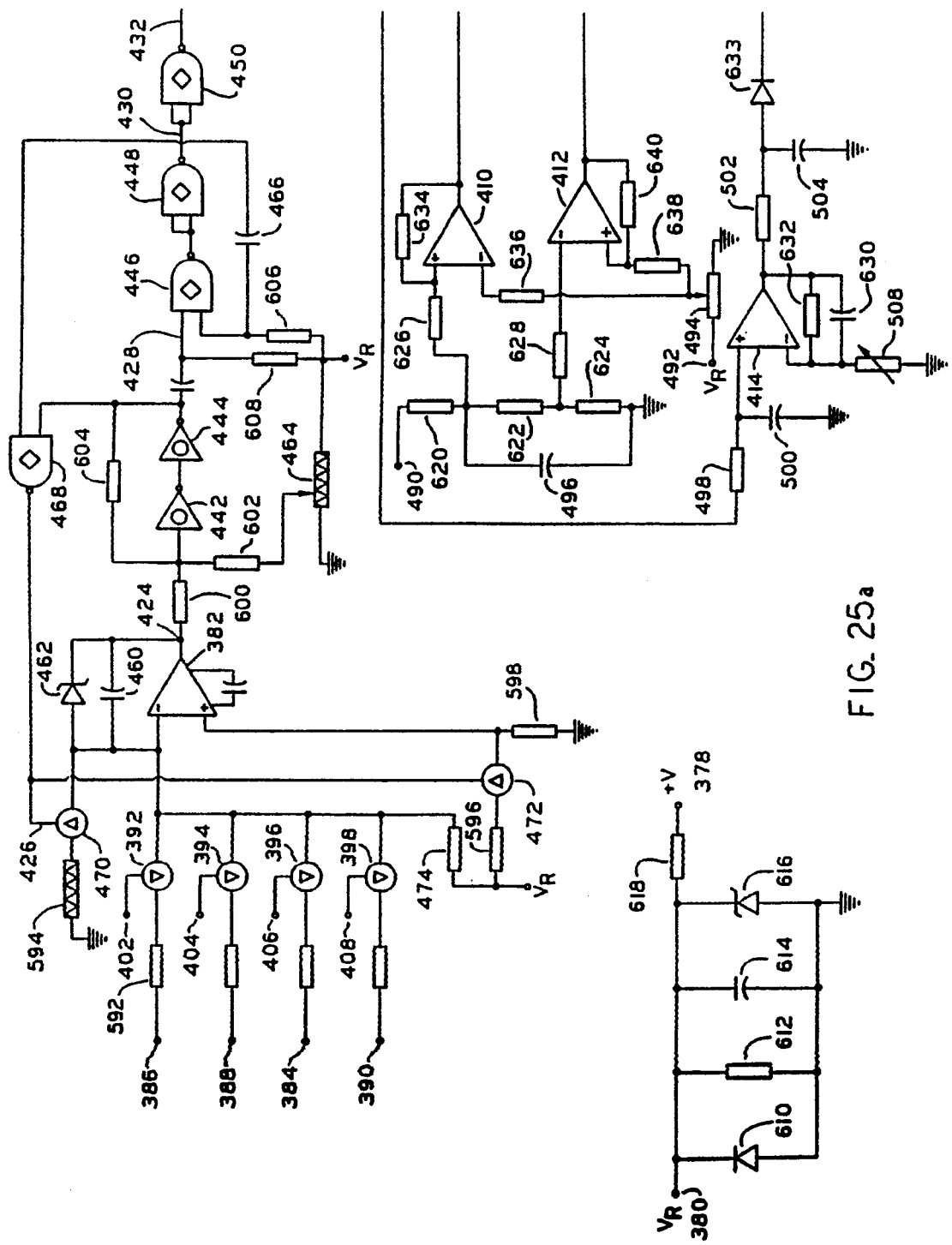
FIGS. 25A and 25B together form a detailed schematic diagram of a modified circuit for indirect rotor position sensing and control
Figure 25B:
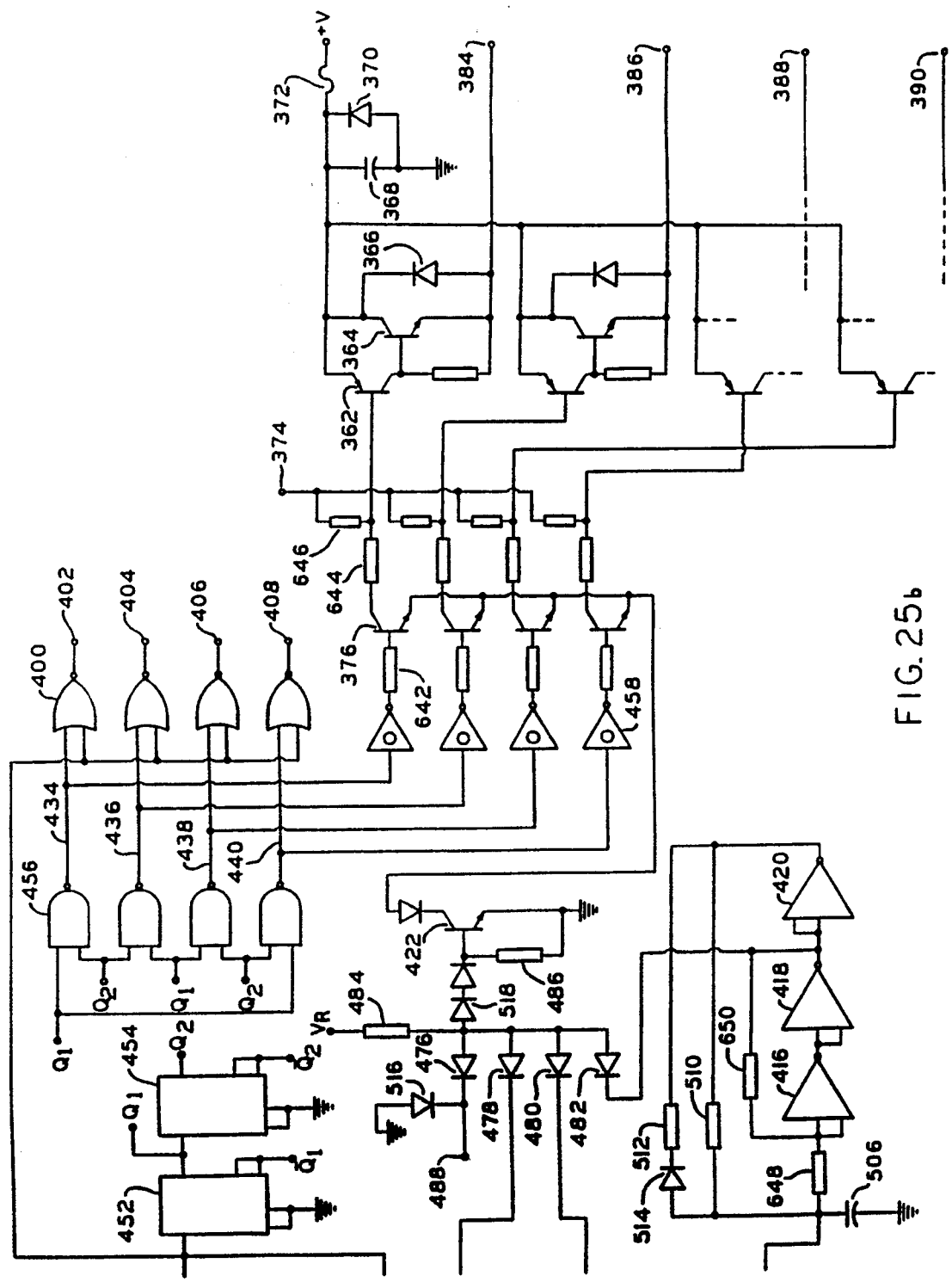
Figure 26:
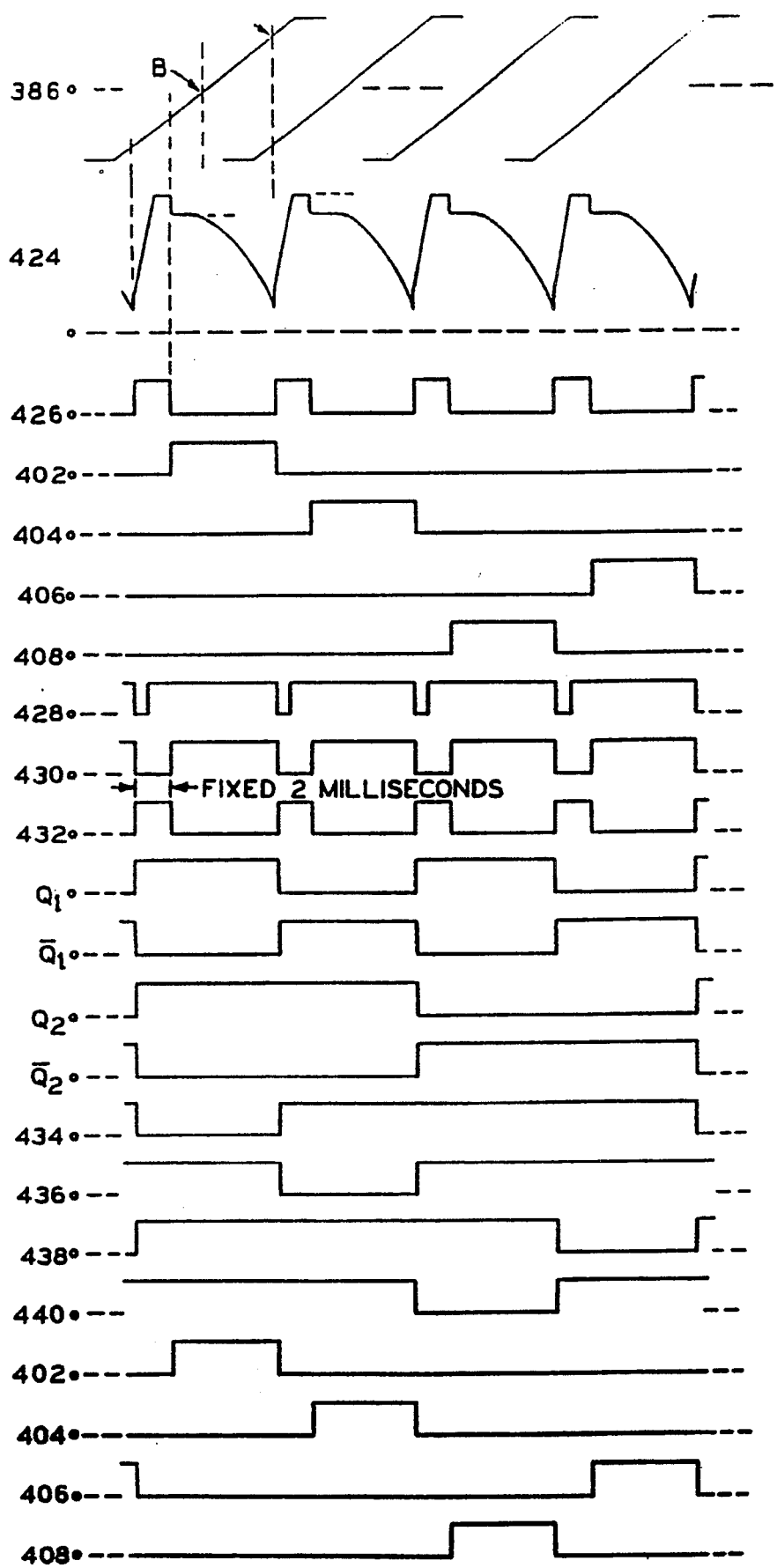
FIG. 26 illustrates various wave forms for the circuit of FIG. 25.

The wave forms of FIG. 26 illustrate the steady state or running mode of the circuitry of FIGS. 25a and 25b with corresponding reference numerals to the right of the wave form identifying the line in the schematic diagram where that wave form occurs. Somewhat idealized back emfs of the motor winding are shown at the top of FIG. 26 and the object of the circuit will be to switch from one winding to the next when the rotor magnet is within ten to fifteen electrical degrees of fully coupling the winding to be turned on. This is shown as time or point A in FIG. 26. This triggering point is determined by integrating the back emf in the amplifier 382 beginning at point B which is the zero back emf point. The voltage is integrated for a period of time and is a measure of the flux change rather than a function of the motor speed. When this integration is completed and the triggering point B achieved, the Schmitt trigger output 428 is actuated. This integration interval between points B and A is preceded by a two millisecond reset period during which capacitor 460 charges back to the reference voltage of, for example, 6.8 volts as determined by the zaner diode 462. Integration is also preceded by another period of a duration determined by the motor speed and physically that time interval during which the back emf is negative. The triggering point for the Schmitt trigger circuit is adaptable by potentiometer 464.

The Schmitt trigger output actuates the one-shot multivibrator which provides an output change for a two millisecond interval as determined by the specific value of capacitor 466 and this output change by way of NAND gate 468 turns on switches 470 and 472 to reset the operational amplifier 382. The one-shot output is also inverted in NAND gate 450 and further processed by the flip-flops 452 and 454 to produce signals suitable for sequentially turning on the Darlington power transistors. NAND gate 468 also assists motor starting since when the motor and circuit are first energized capacitor 460 is discharged and the one-shot multivibrator has a high output on line 430 and would normally remain with that high output until capacitor C2 is charged and an integration cycle completed. The Schmitt trigger, however, has its output intially low and that output remains low long enough for a high output from the NAND gate 468 to turn on switches 470 and 472 to reset or charge capacitor 460.

The NOR gates such as 400 actuate the electronic switches such as 392 to sequentially gate the back emf voltages from the windings to the operational amplifier 482. However, this sequential gating is held off for a two millisecond interval as illustrated in the wave forms identified as 402, 404, 406 and 408, in order to allow capacitor 460 to recharge. At the starting of the motor, the back emf is small and voltage-time integration in the operational amplifier might not take place except for the presence of resistor 474 which simulates a low speed back emf signal and assures a continuous cycling of the closed loop operational amplifier-Schmitt trigger-one one shot system. This cycling takes place at a rate equivalent to 400 revolutions per minute for the motor and the remaining circuitry responds accordingly to sequence the motor windings in the desired direction of rotation. Once the rotor is turning, the back emf signals predominate and the motor continues operation as described. In the event that the rotor starts rotating in the wrong direction, continued erroneous rotation or oscillation is prevented since the back emf signal has a reverse polarity and integration takes place very rapidly and the next winding in the proper direction of rotation is promptly switched on.

As noted earlier, transistors such as 376 will respond to high signals sequentially generated by gates such as 458 only if transistor 422 is conducting and this transistor will conduct so long as the cathodes of diodes 476, 478, 480 and 482 are all at the $V_r$ reference voltage and the current flow through resistor 484 is essentially the sum of the base to emitter current in transistor 422 plus the current flow in resistor 486. Grounding or lowering the potential on terminal 488 would disable transistor 422 while on the other hand raising that voltage to the $V_r$ reference level or above will, under normal conditions, allow transistor 422 to conduct. Similarly, if the output of operational amplifiers 410 and 412 is low, transistor 422 will be disabled while if those operational amplifiers have high outputs, transistor 422 will normally conduct. Both operational amplifiers 410 and 412 function to compare the battery voltage V as applied at terminal 490 to the zener regulated reference voltage as applied at terminal 492, however, the reference voltage is applied to the positive terminal of amplifier 412 and therefore that amplifier output will be low so long as the fraction of the battery voltage applied to its negative terminal is greater than the fraction of the reference voltage, as determined by the setting of potentiometer 494, which is applied to its positive terminal. Thus, operational amplifier 412 has a high output so long as, for example, the battery voltage is above 10.5 volts and functions as a low voltage detector. Similarly, operational amplifier 410 is set by the appropriate choice of voltage dividing resistors to have a high output so long as battery voltage is below, for example, 16 volts and this operational amplifier functions as a high voltage detector. The capacitor 496 is present to filter transients and erratic wave forms from a battery charging device to prevent false indications of under or over voltage.

Numerous further control functions may be implemented employing the electronically commutated motor control circuit of FIGS. 25a and 25b by hanging additional diodes to the base of the transistor 422 to divert that transistor's enabling current when the diode is biased to conduct thereby disabling transistors 376 and therefore also the winding enabling transistor pairs. For example, circuitry illustrated in FIGS. 25a and 25b and connected to diode 482 will function to disconnect the windings when for some reason the motor is running at an inordinately slow speed. The output of gate 450 is a 250 hertz rectangular wave which is on about ½ of the time. This signal is filtered by resistor 498 and capacitor 500 and thereafter amplified by amplifier 414 to be again filtered by the resistor 502 and capacitor 504. The resulting direct current voltage which is substantially proportional to speed is stored as a voltage on capacitor 506 and, so long as that voltage is at or above the level representative of 2,500 revolutions per minute, for example, the output of the Schmitt trigger comprising amplifiers 416 and 418 remains high. Calibration of this voltage or speed level may be achieved by changing potentiometer 508. If the motor speed becomes too low, the Schmitt trigger circuit changes to its low state allowing current flow through diode 482 and simultaneously providing a high output from the amplifier 420 to charge capacitor 506. The time constant for capacitor 506 and resistor 510 along with the hysteresis of the Schmitt trigger circuit 416, 418 determines a reset time for the circuit and several minutes such as 4 to 5 may be involved.

At initial start up of the motor this same 4 to 5 minutes must elapse before the start can occur. The capacitor 504 will typically retain its charge sufficiently long for normal on-off duty cycle functioning of, for example, a refrigerator motor, however, if a restart is made and the exemplary 2,500 revolution per minute speed is not achieved within say three to five seconds, the time constant of capacitor 506 and resistor 512, the start will be aborted and the five minute delay for recharging capacitor 506 initiated prior to a restart attempt. The relatively long charging time for capacitor 506 and comparatively short discharge time is of course due to the presence of diode 514 and the substantially lower resistance of resistor 512 as compared to resistor 510.

In the exemplary vehicle refrigeration environment, a condenser cooling fan would typically be coupled across diode 516 and that diode would function to conduct energy stored in the inductance of the fan motor. In other environments without such a fan motor a resistance would be substituted for the diode 516. Diodes 518 are included to give an additional small voltage drop to the base of transistor 422 since, in practice, the low outputs of amplifiers, such as 410 and 412, may not be exactly zero.

Figure 27:
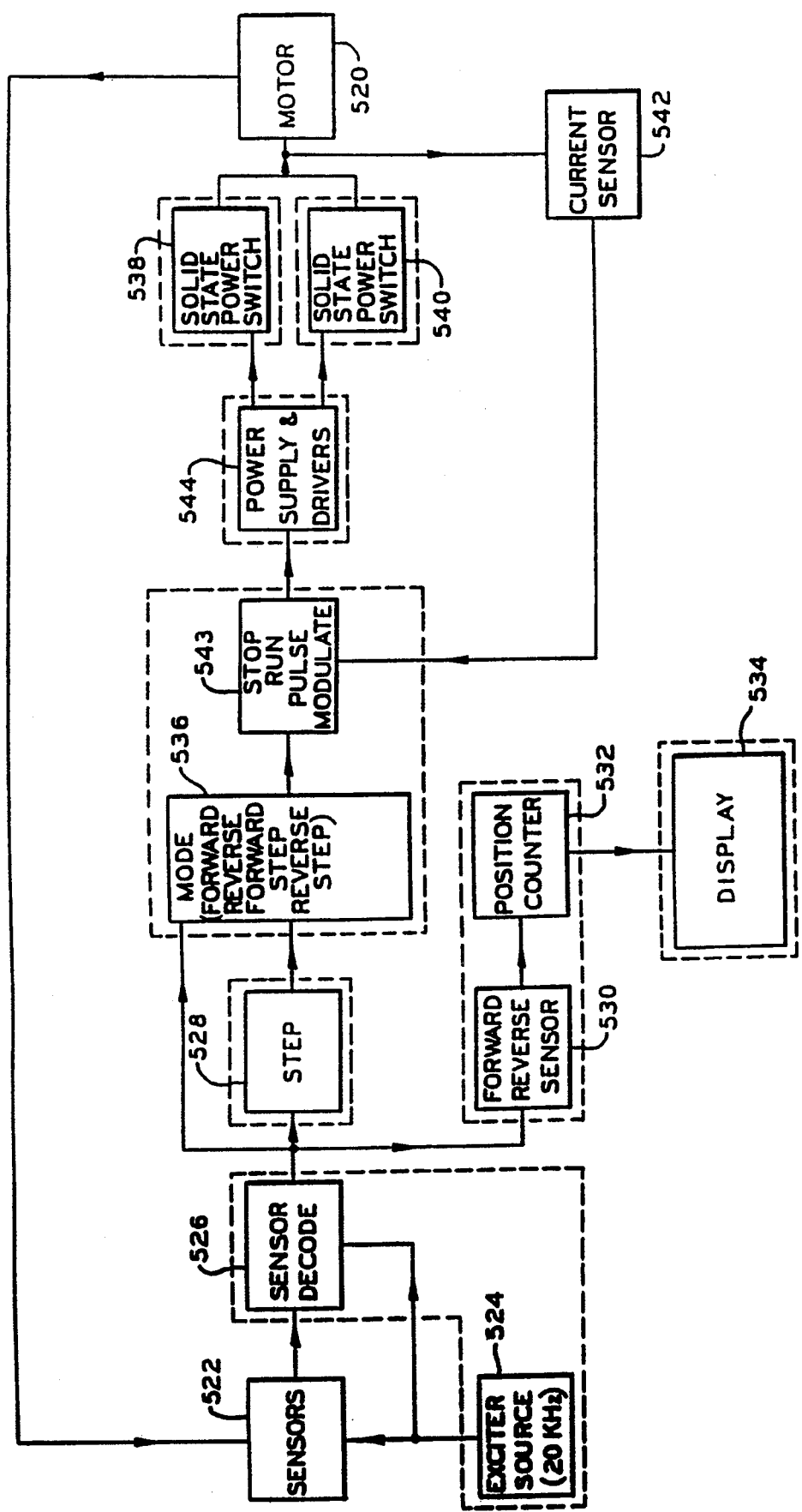
FIG. 27 is a block diagram of a control circuit for precise rotor positioning.

As noted earlier, the fact that the brushless direct current motor of the present invention may be enabled by rectangular wave forms which are processed by logic circuitry makes possible a number of motor control embodiments employing digital control techniques. One particularly unique digital application of the electronically commutated motor of the present invention is illustrated in FIG. 27 and may be employed, for example, for moving and precisely positioning a linearly movable element. The brushless direct current motor 520 has rotor position sensors 522 and in this environment a six pole machine employing GECOR (cobalt samarium) permanent magnets was employed to meet the low operating speed and size constraints. Also, in this particular embodiment, electromagnetic sensors are employed and the 20 kilohertz exciter source provides a signal for these sensor signal exciter coils. In the linearly movable element environment, the motor 520 by way of a screw shaft drives the element and accurate control of the motor results in accurate positioning of the element. Use of the direct current motor of the present invention has many advantages over the conventional approach to linearly moving elements in that typical gear boxes and stopping brakes as well as safety clutches are eliminated and the locking torque of the motor may serve as a holding brake. Further, the system is uniquely suited to battery operation and is easily controlled by a process computer for forward, reverse, stepping or braking commands.

These sensors 522 are of course physically located with the motor 520 and stationary exciter and pick up coils are sequentially coupled and decoupled from each other by a rotating segmented disc or shutter supported on the motor rotor shaft. The exciter coils are energized by the 20 kilohertz exciter source 524 and the pick-up coil signals processed in the decoder 526 to produce uniform rectangular voltage wave forms for subsequent processing. The output of the sensor decoding circuitry 526 is supplied to stepping logic circuitry 528, counter logic circuitry including the forward-reverse sensor 530 and a position counter 532, the contents of which may be digitally displayed employing typical seven segment display units in the display panel 534. The output of the sensor decoding circuit 526 is also supplied to mode control circuitry 536 which sorts out forward, reverse, forward step, and other commands and relates those commands to the sensor signals to compile that information in four logic gates. There is one such gate for each of the four transistor power switches and at any given time only one of those gates will have a high output. These outputs are modified in another set of gates which accept the run and stop commands as well as current limiting information. Current limiting is carried out as a pulse width modulation process and the output of these last gates is amplified in two stages of transistor drivers which in turn supply base current to the transistor power switches 538 and 540. Motor current may be sensed at 542 and if that current is excessive, gates in the pulse modulating circuitry 544 are inhibited for a short time period, such as 500 microseconds to inhibit the power supply and driver circuitry 544 for a like time period allowing the motor current to decay somewhat.

It will now be apparent that I have shown and described different embodiments of my invention, in preferred forms thereof. At the present time, the star connection arrangement utilizing bifilar windings is believed to be the better mode as compared to a monofile bridge circuit arrangement.

This is because less transistors are required for the star approach and therefore less expense is involved even though less efficient utilization of winding material (e.g., copper or aluminum) results. On the other hand, if and when the relative expense of transistors and winding material changes in favor of solid state devices, the monofilar/bridge circuit would be preferred.

When either approach is followed, it is definitely preferable to provide energy storage means (e.g., as described hereinabove) in order not only to protect the output transistors but to improve the efficiency of energy utilization.

When either approach is used, methods embodying other aspects of my invention may be practiced, of course. For purposes of summary, such methods relate of course to the manufacture of brushless DC motors (whether or not they are of the electronically commutated variety), and include: the selection of AC induction motor types of cores; the development of distributed windings in slots of such cores by means of available AC induction motor equipment to form wound stator assemblies; and the assembly of such wound stator assemblies with permanent magnet rotor assemblies. The development of the distributed windings preferably includes the provision of at least two coil groups (for optimization, four coil groups), that each comprise one or more concentric coils of one or more turns each.

The winding turns may be wound and established (con-currently or sequentially) in coil receiving means and then axially inserted into the axially extending core slots (either directly from the coil receiving means or from an axial inserting means to which the winding turns are transferred from the coil receiving means).

It should be recognized that the methods just briefly summarize represent a departure from the art of making DC motors of which I am aware. For example, prior techniques have involved the formation of what are known as "ring" windings (e.g., wave or lap windings) which are disposed on a conventional DC dynamoelectric machine core.

Further, there has been shown and described a simplified circuit for commutating the energizing signals applied to a brushless DC motor. More specifically, the circuitry of this invention does not require a mechanical sensor assembly coupled to the rotor of the brushless DC motor; instead, the output of the motor is sensed and is used to generate a varying signal of a frequency corresponding to the rotational velocity and indicating the position of the rotor. Thus, in certain applications such as for use with a brushless DC motor for driving a refrigeration compressor, the compressor shell does not require additional through leads, thereby improving the hermetic seal of the shell.

To better reveal the improved characteristics of motors embodying the invention, the data of Table I is presented.

TABLE I

Data taken at 2600 rpm

| Advance, alpha in Electrical Degrees | Torque, Total | Oz.Ft. Net | Efficiency, Total* | % Net** |
|---|---|---|---|---|
| 0 | 1.15 | .95 | 73.7 | 60.9 |
| 5 | 1.20 | 1.00 | 78.2 | 65.2 |
| 15 | 1.50 | 1.30 | 81.2 | 70.4 |
| 22 | 1.60 | 1.35 | 77.7 | 65.6 |

*without regard to windage and friction loss
**including windage and friction loss The data of Table I was obtained by testing one motor that embodies the present invention and that was operated from a 12 volt DC supply.

The motor utilized a standard stator lamination design that is used commercially in induction motor applications. The lamination was substantially identical to the lamination shown in FIG. 2. The bore of the core was about 2 inches with a stack height of about 2 inches. The core had 24 slots, and carried distributed copper magnet wire winding side turn portions that were bifilar wound. Eight winding coil groups total (four bifilar coil groups) were used. Each coil group included three coils and each coil comprised from outermost coil to innermost coil respectively: 7, 10, and 10 turns. The wire was about 0.05 inch diameter (uninsulated) copper wire. The 30 coils of each coil group spanned, from outer to inner coils respectively, 11, 9, 7 teeth respectively. Thus, the "spread" of an associated pair of coil groups was six slots or 90 mechanical degrees. It thus will be understood that eight slots contained 14 conductors (seven bifilar conductor pairs), while the rest of the slots had 20 conductors each.

The rotor magnets were formed of ferrite magnet material from Allen Bradley Co. and designated as M-7 material. The arc length of each of the two magnets used was 143 mechanical degrees; the thickness was about 0.25 inches; and the axial length was about two inches. The magnets were epoxy bonded to a solid, soft iron rotor core and the assembled rotor had an outer diameter of about 1.98 inches. Commutation and sensing was accomplished with circuits substantially identical to those shown herein. The actual circuit components (i.e., transistors, resistors, capacitors, etc.) were commonly available types and were selected to have only sufficient voltage and current ratings and gain to supply up to 30 amperes to the motor windings. The motor was commutated with from zero to twenty-two electrical degree advance. Since the motor was a two-pole motor, electrical degrees were of course equal to mechanical degrees.

In Table I, two efficiency and torque columns are recorded. The total torque represented the torque produced by the motor without regard to windage and friction losses. The first "efficiency" column also was the efficiency of the motor without regard to windage and friction losses, although copper and commutator circuit losses were allowed for. Net torque was the net torque available at the shaft of the motor, and net efficiency was the overall efficiency of the motor system including the commutator. The significant reduction in net efficiency (due to windage and bearing losses) was expectable because the motor tested was only about 1/20 horsepower.

Table I does show the significant improvement in efficiency and torque that is attainable by advancement of commutation. Thus, a 15 electrical degree advance would provide significantly more maximum efficiency at 2600 rpm; whereas an advance of 22 degrees would provide significantly greater maximum torque at 2600 rpm.

TABLE II

Representative component values or element identification for the foregoing circuits.

| Reference No. | Component |
|---|---|
| FIGS. 6 and 7 | |
| 70', 80 | CD4001 AE |
| 43, 44 | H 13 A2 |
| 71, 72 | 390K |
| 74 | 1.8K |
| 92 | 39 OHM 2W |
| 93 | 2000 MFD 300V. |
| 94 | 100 MFD |
| 95 | 15V. |
| 81 | 2N 4401 |
| 82 | 2N 5988 |
| 83 | 2N 6258 |
| 84 | 10K |
| 86 | 150 OHM |
| 88 | A 15 |
| 91 | 500 or 1000 MFD |
| FIG. 16 | |
| 130 | .02 OHM |
| 132, 133, 140, 736, 145, 740 | 100K |
| 134 | 120K |
| 135, 734, 149 | 50K |
| 138 | 3.5 MEGOHM |
| 146 | 1 MEGOHM |
| 738 | 82K |
| 150 | 2.2K |
| 153 | 1K |
| 155 | 47 OHM |
| 156 | 120K |
| 742 | 33K |
| 136, 144, 148 | MC 3301 P |
| 160, 162 | CD 4013 AE |
| 158 | 2N 3414 |
| 154 | 2N 1671 |
| FIG. 18 | |
| 186, 170, 172, 194, 196 | CD 4016 AE |
| 182 | CD 4013 AE |
| 164, 166, 174, 176 | LM 324 |
| 168, 198 | L 3900 |
| 166 | .02 OHM |
| 546, 548, 550, 552, 554, 556, 558, 560, 562 | 10K |
| 564 | 120K |
| 566 | 4.7K |
| 568, 570, 572, 574, 576, 578 | 100K |
| 580, 582 | 150K |
| 584 | 1 MFD |
| 180 | .01 MFD |
| 586 | 22K |
| 588 | 1 MEGOHM |
| 590 | 270K |
| FIG. 19 | |
| 204 | Two parallel .10 OHM 2W |
| 208 | 10 V. |
| 702 | 1.2 MEGOHM |
| 704, 706 | 100K |
| 214 | Series 100K & 200K Variable |
| 708, 710 | 1 MEGOHM |
| 210 | MC 3301 P |
| 712 | 82K |
| 222 | 390 MFD |
| 714, 716 | 47K |
| 220 | .01 MFD |
| 718 | 3.9 MEGOHM |
| 218 | Series 33K & 500K Variable |
| 224 | 1N914 |
| FIGS. 21 and 22 | |
| 246 | H13 A2 |

TABLE II-continued

Representative component values or element identification for the foregoing circuits.

| Reference No. | Component |
|---|---|
| 652, 654 | 39K |
| 656, 660, 670 | 1K |
| 658 | 560 OHM |
| 256, 258, 260, 262, 290 | CD 4001 |
| 264, 266, 268, 270 | CD 4001 |
| 272, 286 | 2N 4401 |
| 662 | 47 OHM 2W |
| 664 | 5000 MFD |
| 666, 678 | 10K |
| 668 | 10 OHM 10W |
| 672 | 100 OHM |
| 674, 676 | .03 OHM |
| 284 | A 115 |
| 294, 680, 682 | .001 MFD |
| 292 | 100K |
| 296 | 1N914 |
| 298 | 33K |
| 288, 302, 304 | MC 3401 |
| 308 | 2N3414 and D44H5 |
| 312 | A 15 |
| 684, 686 | 22K |
| 688, 691 | 1 MEGOHM |
| 690 | 2.2 MEGOHM |
| 692, 694 | 100K |
| 696, 700 | 1 MFD |
| 698 | 27K |
| FIG. 24 | |
| 720, 722 | 8.2K |
| 356 | 2.2K |
| 350 | 2N 3414 |
| 724, 726, 728 | 10K |
| 730, 732 | 82 OHM |
| FIGS. 25a and 25b | |
| 592 | 10K |
| 594 | 680 OHM |
| 474 | 5.6 MEGOHM |
| 596 | 150K |
| 598 | 10K |
| 462 | 1N4736 6.8V. |
| 460 | .1 MFD |
| 382 | CA 3130 |
| 600, 602 | 10K |
| 464 | 100K |
| 604 | 1 MEGOHM |
| 606 | 150K |
| 608 | 33K |
| 446, 448 | CD 4011 |
| 466 | .01 MFD |
| 610 | 1N5059 |
| 612 | 10K |
| 614 | 25 MFD 25V. |
| 616 | 1N4738 8.2V. |
| 618 | 120 OHM 1W |
| 620 | 33K |
| 622 | 6.8K |
| 624 | 12K |
| 626, 628, 508, 636, 638 | 100K |
| 494 | 20K |
| 498, 632 | 33K |
| 500, 504 | .5 MFD |
| 630 | .1 MFD |
| 410, 412, 414 | LM 324 |
| 502 | 15K |
| 633 | 1N4448 |
| 634 | 1.8 MEGOHM |
| 640 | 4.7 MEGOHM |
| 452, 454 | CD 4013 |
| 456 | CD 4011 |
| 400 | CD 4001 |
| 458 | CD 4049 |
| 642 | 2.7K |
| 644 | 100 OHM 2W |
| 646 | 100 OHM |
| 376 | 2N3414 |
| 362 | 2N5988 |
| 364 | 2N6258 |
| 366 | 1N5059 |
| 368 | 1000 MFD 25V. |
| 370 | MR 751 |
| 480, 514 | 1N4448 |
| 484 | 6.8K |
| 486 | 2.7K |
| 648 | 1.5 MEGOHM |
| 650 | 4.7 MEGOHM |
| 510 | 2.2 MEGOHM |
| 512 | 68K |
| 416, 418 | CD 4001 |
| 506 | 50 MFD |
| FIG. 27 | |
| 542 | Two parallel .1 OHM 10W |
| 538, 540 | STV 6060 with 1W 5625 and V150 PA10 in parallel collector to emitter |
| 544 | 2N 3414 driving D45H8 |
| 536 | CD 4011 |
| 543 | CA 3130T and CD 4012 as input to CD 4011 then to CD 4049 invertor output |
| 528 | CD 4042 driving CD 4011 then to CD 4012. Also CD 4001, CD 4011 and CD 4029 |
| 524, 526 | CD 4011 input to CD 4030, CD 4011 and CD 4001 in series Also three 2N 3414 |
| 530 | CD 4042, CD 4011 and CD 4012 in series |
| 532 | CD 4001 driving CD 4011 and also CD 4029 |
| 534 | MC 14511 to MAN54 |

The solid state components listed in Table II hereinabove, with the exception of transistors STV 6060 and displays MAN54 (see FIG. 27) were either RCA, G.E., National, or Motorola devices. The four transistors STV 6060 were TRW transistors, and the four displays MAN54 were Monsanto displays.

While the invention has been described in connection with different embodiments thereof, variations will be readily apparent to those skilled in the art from reading the foregoing description. Thus, in accordance with the Patent Statutes, I have described what at present is considered to be preferred embodiments of my invention, but it is to be clearly understood that this description is made only by way of example and not for purposes of limitation.

What is claimed:

1. A method of operating a brushless motor having a stationary assembly with at least two different energizable windings for producing spaced apart magnetic fields in time sequence, and a rotor adapted to rotate in response to the magnetic fields, the method comprising the steps of:

simulating rotor position in accordance with the back emf condition of at least one winding;

selectively energizing the windings in accordance with the simulated rotor position;

sensing an underspeed condition when the motor speed is less than a minimum value for a length of time; and preventing energization of any of the windings when the motor speed is less than the minimum value for the length of time.

2. A method as set forth in claim 1 wherein the sensing step includes sensing a voltage related to the motor speed in a circuit having a time constant and wherein the length of time is a function of the time constant.

3. A method as set forth in claim 1 further comprising the step of resuming energization of the motor windings when a reset time has elapsed.

4. A method as set forth in claim 1 wherein said step of sensing an underspeed condition includes the steps of repeatedly producing a pulse when each of the windings is to be commutated, filtering the pulses so produced to develop a direct current voltage which is substantially proportional to the motor speed, and providing a signal when the direct current voltage is less than an electrical level representative of the minimum level of the motor speed.

5. A method as set forth in claim 4 wherein said step of repeatedly producing a pulse includes the steps of integrating the back emf until a triggering point is reached and then supplying the pulse.

6. A method of operating a brushless motor having a stationary assembly with at least two windings energizable from a voltage source for producing spaced apart magnetic fields in time sequence, and a rotor adapted to rotate in response to the magnetic fields, the method comprising the steps of:
    simulating rotor position in accordance with the back emf condition of at least one winding;
    selectively energizing the windings from the voltage source in accordance with the simulated rotor position;
    sensing an undervoltage condition when the voltage source provides a voltage that is less than a minimum value; and
    preventing energization of any of the windings when the undervoltage condition is sensed.

7. A method as set forth in claim 6 wherein the step of sensing the undervoltage condition includes the steps of voltage dividing the voltage provided by the voltage source to produce a fraction thereof, providing a reference voltage and voltage dividing the reference voltage to supply a value that is a fraction of the reference voltage, and producing an output indicative of presence of the undervoltage condition when the fraction of the voltage provided by the voltage source is less than the value that is a fraction of the reference voltage.

8. A method as set forth in claim 6 further comprising the steps of sensing an overvoltage condition when the voltage source provides a voltage that is greater than a maximum value, and preventing energization of any of the windings when the overvoltage condition is sensed.

9. A method as set forth in claim 8 further comprising the steps of sensing an underspeed condition when the motor speed is less than a minimum value for a length of time, and preventing energization of any of the windings when the motor speed is less than the minimum value for the length of time.

10. A method as set forth in claim 6 further comprising the steps of sensing an underspeed condition when the motor speed is less than a minimum value for a length of time, and preventing energization of any of the windings when the motor speed is less than the minimum value for the length of time.

11. A method as set forth in claim 6 wherein the simulating step includes integrating the back emf and producing an output when a triggering point is reached to effect commutation of the windings.

12. A method of operating a brushless motor having a stationary assembly with at least two windings and energizable from a voltage source for producing spaced apart magnetic fields in time sequence, and a rotor adapted to rotate in response to the magnetic fields, the method comprising the steps of:
    determining the back emf condition of at least one winding;
    simulating rotor position in accordance with the determining back emf condition of said at least one winding;
    selectively energizing the windings with a voltage from the voltage source in accordance with the simulated rotor position as defined by the determined back emf;
    sensing an overvoltage condition when the voltage is greater than a maximum value; and
    preventing energization of any of the windings when the overvoltage condition is sensed.

13. A method as set forth in claim 12 wherein the step of sensing the overvoltage condition includes the steps of voltage dividing the voltage provided by the voltage source to produce a fraction thereof, providing a reference voltage and voltage dividing the reference voltage to supply a value that is a fraction of the reference voltage, and producing an output indicative of presence of the overvoltage condition when the fraction of the voltage provided by the voltage source is greater than the value that is a fraction of the reference voltage.

14. A method as set forth in claim 12 further comprising the steps of sensing an underspeed condition when the motor speed is less than a minimum value for a length of time, and preventing energization of any of the windings when the motor speed is less than the minimum value for the length of time.

15. A method as set forth in claim 12 wherein the simulating step includes integrating the back emf and producing an output when a triggering point is reached to effect commutation of the windings.

16. A control system for a brushless motor for energization from a voltage source for the motor, the motor having a stator with windings and a rotor mounted for rotation relative to the stator, comprising:
    a circuit for generating an input signal corresponding to the presence of the rotor at one of a plurality of predetermined rotary positions with respect to the stator;
    electrically controllable switches connected to the windings to control the flow of current therethrough;
    an electronic control responsive to the input signal for controlling in a closed loop running mode the switches to commutate the windings of the motor after receipt of the input signal, said electronic control also being responsive to the speed of the motor, and operative to start the motor in a starting mode by controlling the switches to commutate the windings at an increasing rate, and then to shift commutation to the running mode once the motor reaches a predetermined speed, said electronic control being operative to determine the commutation rate as a function of the voltage applied to the motor.

17. The control system as set forth in claim 16 further comprising a power control for variably supplying the voltage for the motor, wherein said electronic control includes regulator means for supplying a control output to said power control, whereby the level of the voltage for the motor is controlled so that the stator windings are energized to a level established by said regulator means.

18. The control system as set forth in claim 16 wherein said electronic control comprises means for increasing the motor speed to a running speed in excess of the predetermined speed of commutation shift.

19. The control system as set forth in claim 16 further comprising a motor current sensor, wherein said electronic control includes means responsive to said motor current sensor for varying the commutation by said electronically controllable switches as a function of the motor current.

20. The method for controlling a brushless motor for energization from a source of voltage for the motor, the motor having a stator with windings and a rotor mounted for rotation relative to the stator, with electrically controllable switch means connected between the source and the windings to control the flow of current therethrough, the method comprising the steps of:
   determining an increasing rate of commutation as a function of the voltage applied to the motor;
   starting the motor in a starting mode by controlling the switch means to commutate the windings at the determined increasing rate;
   once a predetermined motor speed has been reached, shifting commutation from said starting mode to a running mode of operation;
   generating an input signal corresponding to the presence of the rotor at one of a plurality of predetermined rotary positions with respect to the stator; and
   controlling the switch means to commutate the windings of the motor after the input signal is generated.

21. A method as set forth in claim 20 further comprising the step of regulating the voltage for the motor as a function of the speed of the motor.

22. A method as set forth in claim 20 further comprising the step of increasing the commutation of the windings in frequency in the running mode so that the speed of the motor increases from the predetermined speed to a running speed.

23. A method as set forth in claim 20 further comprising the step of varying the energization of said motor windings as a function of the current in the motor.

24. A control system for an electronically commutated motor adapted to be energized from a source of voltage and including a stationary assembly having a plurality of winding stages adapted to be electronically commutated in at least one preselected sequence, and a rotatable assembly associated in selective magnetic coupling relation with the winding stages, the control system comprising:
   an electronic commutation circuit including switches responsive to control signals and operable generally for electronic commutation of at least some of the winding stages of the electronically commutated motor by applying the voltage thereto in the at least one preselected sequence to effect the energization of the electronically commutated motor and the rotation of the rotatable assembly; and
   a circuit for generating control signals for said electronic commutation circuit, said circuit for generating variably establishing a time interval between commutations as a decreasing function of the voltage applied to the motor, for repeatedly producing in a start mode the control signals for said electronic commutation circuit at the interval variably established, and for shifting commutation to a running mode once the time interval decreases to a predetermined amount.

25. The control system as set forth in claim 24 further comprising a power control for variably supplying the voltage for the motor, wherein said circuit for generating control signals also includes regulator means for supplying at least one control signal to said power control, whereby the voltage for the motor is controlled so that the stator windings are energized to a level established by said regulator means.

26. The control system as set forth in claim 24 further comprising a motor current sensor, wherein said circuit for generating the control signals includes means responsive to said motor current sensor for varying the energization of the electronically commutated motor as a function of the motor current.

27. A method of operating a control system for an electronically commutated motor adapted to be energized from a source of voltage and including a stationary assembly having a plurality of winding stages adapted to be electronically commutated in at least one preselected sequence, and a rotatable assembly associated in selective magnetic coupling relation with the winding stages, the method comprising the steps of:
   electronically commutating at least some of the winding stages of the electronically commutated motor in response to control signals by applying the voltage thereto in the at least one preselected sequence to effect the energization of the electronically commutated motor and the rotation of the rotatable assembly;
   establishing a variable time interval between commutations as a decreasing function of the voltage applied to the motor;
   producing in a start mode the control signals with the variable time so established; and
   shifting commutation to another mode once the time interval decreases to a predetermined amount.

28. A brushless motor system for energization from a voltage source, comprising a brushless electric motor having a stationary assembly with a plurality of windings adapted to be energized through electronic commutation in at least one preselected sequence, and a rotor in selective magnetic coupling relation with said windings; at least one circuit element that generates a position signal corresponding to the presence of said rotor in at least one predetermined rotary position with respect to said stationary assembly; switches connected to said windings to control the flow of current therethrough; and an electronic control responsive to said position signal for controlling said motor in a closed loop running mode with said switches to commutate said winding in response to said position signal, said electronic control also being responsive to the speed of said motor and operative to provide a starting mode to start Said motor by controlling said switches to commutate said windings at an increasing rate and shifting said commutation from said starting mode to said running mode when said motor reaches a predetermined speed, said electronic control being operative to determine the commutation rate as a function of the voltage applied to said motor.

* * * * *